US012786762B2

(12) United States Patent
Bergqvist et al.

(10) Patent No.: US 12,786,762 B2
(45) Date of Patent: Nov. 3, 2026

(54) BEAM LEVEL REPORTING FOR SERVING CELL IN EARLY MEASUREMENTS

(71) Applicant: Telefonaktiebolaget LM Ericsson publ), Stockholm (SE)

(72) Inventors: Jens Bergqvist, Linköping (SE); Stefan Wager, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 420 days.

(21) Appl. No.: 18/272,333

(22) PCT Filed: Jan. 12, 2022

(86) PCT No.: PCT/SE2022/050019
§ 371 (c)(1),
(2) Date: Jul. 13, 2023

(87) PCT Pub. No.: WO2022/154722
PCT Pub. Date: Jul. 21, 2022

(65) Prior Publication Data
US 2024/0080688 A1 Mar. 7, 2024

Related U.S. Application Data

(60) Provisional application No. 63/137,577, filed on Jan. 14, 2021.

(51) Int. Cl.
*H04W 24/08* (2009.01)
*H04B 7/06* (2006.01)
*H04W 76/27* (2018.01)

(52) U.S. Cl.
CPC ........ *H04W 24/08* (2013.01); *H04B 7/06952* (2023.05); *H04W 76/27* (2018.02)

(58) Field of Classification Search
CPC . H04W 24/08; H04W 24/10; H04W 36/0083; H04W 36/08; H04W 72/046;
(Continued)

(56) References Cited

U.S. PATENT DOCUMENTS 12,492,804 B2 * 12/2025 Takenouchi ............ F21V 15/01
2020/0022040 A1 * 1/2020 Chen .................. H04W 72/046
(Continued)

FOREIGN PATENT DOCUMENTS

JP 2021531696 A 11/2021
WO 2020015719 A1 1/2020

OTHER PUBLICATIONS

Office Action, Japanese Patent Application No. 2023-541655, mailed Jul. 26, 2024, 10 pages.
(Continued)

*Primary Examiner* — Jean A Gelin
(74) *Attorney, Agent, or Firm* — Sage Patent Group

(57) ABSTRACT

A method of operating a communication device in a communication network includes receiving, while operating in an idle state, a connected state, or an inactive state, an early measurement configuration to perform an early measurement for reporting to the communication network, wherein the early measurement configuration includes a configuration to perform a beam level measurement for a serving cell. The method includes performing the early measurement including the beam level measurement for the serving cell while operating in the idle state or the inactive state. The method includes reporting an early measurement result including the beam level measurement for the serving cell to the communication network upon the communication device transitioning to the connected state.

15 Claims, 14 Drawing Sheets

(58) Field of Classification Search

CPC ..... H04W 76/27; H04W 76/25; H04W 88/02; H04B 7/06952

USPC .......................................................... 370/252

See application file for complete search history.

(56) References Cited

U.S. PATENT DOCUMENTS

| | | | | |
|---|---|---|---|---|
| 2020/0029239 | A1* | 1/2020 | Zhang | H04W 56/0005 |
| 2020/0396633 | A1* | 12/2020 | Tseng | H04W 24/10 |
| 2020/0403743 | A1 | 12/2020 | Bergqvist et al. | |
| 2021/0120481 | A1* | 4/2021 | Cheng | H04W 56/001 |
| 2021/0160724 | A1* | 5/2021 | Yang | H04W 24/10 |
| 2021/0345201 | A1* | 11/2021 | Cheng | H04W 24/10 |
| 2021/0345405 | A1* | 11/2021 | Kim | H04W 74/0808 |
| 2022/0086676 | A1* | 3/2022 | Al | H04W 24/10 |
| 2022/0116809 | A1* | 4/2022 | Cheng | H04W 56/001 |
| 2022/0116839 | A1* | 4/2022 | Tseng | H04W 36/0061 |
| 2022/0182850 | A1* | 6/2022 | Ramachandra | H04W 24/02 |
| 2022/0232471 | A1* | 7/2022 | Laselva | H04W 24/08 |
| 2023/0080009 | A1* | 3/2023 | Wang | H04L 5/0091 370/252 |
| 2023/0134552 | A1* | 5/2023 | Kim | H04W 68/02 370/329 |
| 2023/0284056 | A1* | 9/2023 | Fu | H04W 16/28 370/328 |
| 2023/0422071 | A1* | 12/2023 | Ramachandra | H04W 24/10 |
| 2024/0015809 | A1* | 1/2024 | Cheng | H04W 76/10 |
| 2024/0179742 | A1* | 5/2024 | Kim | H04W 76/18 |

OTHER PUBLICATIONS

International Search Report and Written Opinion of the International Searching Authority, PCT/SE2022/050019, mailed Aug. 1, 2022, 15 pages.

Ericsson, "Multi-RAT Dual-Connectivity and Carrier Aggregation enhancements (LTE, NR)," 3GPP TSG RAN meeting #90-e, RP-202309, Electronic meeting, Dec. 7-11, 2020, 64 pages.

Ericsson, "Serving cell reporting in early measurements," 3GPP TSG-RAN WG2#113e, Tdoc R2-2101090, Electronic meeting, Jan. 25-Feb. 5, 2021, 12 pages.

3GPP TS 38.300 v16.4.0 (Dec. 2020); 3rd Generation Partnership Project; Technical Specification Group Radio Access Network; NR; NR and NG-RAN Overall Description; Stage 2 (Release 16), 149 pages.

3GPP TS 38.331 v16.3.1 (Jan. 2021); 3rd Generation Partnership Project; Technical Specification Group Radio Access Network; NR; Radio Resource Control (RRC) protocol specification (Release 16), 932 pages.

* cited by examiner

BEAM LEVEL REPORTING FOR SERVING CELL IN EARLY MEASUREMENTS

CROSS REFERENCE TO RELATED APPLICATIONS

This application is a 35 U.S.C. § 371 national stage application of PCT International Application No. PCT/SE2022/050019 filed on Jan. 12, 2022, which in turn claims domestic priority to U.S. Provisional Patent Application No. 63/137,577, filed on Jan. 14, 2021, the disclosures and content of which are incorporated by reference herein in their entirety.

TECHNICAL FIELD

The present disclosure relates generally to communications, and more particularly to communication methods and related devices and nodes supporting wireless communications.

BACKGROUND

In Rel-10, Carrier Aggregation (CA) was introduced in long term evolution (LTE) to enable the user equipment (UE) to transmit/receive information via multiple cells (sometimes called Secondary Cells—SCell(s)) from multiple carrier frequencies, to benefit of the existing of non-contiguous and contiguous carriers. In CA terminology, the Primary Cell (PCell) is the cell towards which the UE established the radio resource control (RRC) connection or did handover to. In CA, cells are aggregated on medium access control (MAC)-level as shown in FIG. 1 where PDCP is packet data convergence protocol and RLC is radio link control. The MAC gets grants for a certain cell and multiplexes data from different bearers to one Transport Block (TB) being sent on that cell. Also, MAC controls how that process is done.

SCells can be "added" (a.k.a. "configured") for the UE using RRC signaling (e.g., RRCConnectionReconfiguration), which takes in the order of 100s of milliseconds. A cell which is configured for the UE becomes a "serving cell" for this UE. An SCell may also be associated to an SCell state. When configured/added via RRC, an SCell starts in deactivated state. In LTE Rel-15, the eNB (EUTRAN (evolved universal mobile telecommunications system terrestrial radio access) base station) can indicate to activate-upon-configuration, or change the state, at least in RRCReconfiguration, as shown below:

1> for each secondary cell SCell configured for the UE other than the primary secondary cell (PSCell):
  2> if the received RRCConnectionReconfiguration message includes sCellState for the SCell and indicates activated:
    3> configure lower layers to consider the SCell to be in activated state;
  2> else if the received RRCConnectionReconfiguration message includes sCellState for the SCell and indicates dormant:
    3> configure lower layers to consider the SCell to be in dormant state;
  2> else:
    3> configure lower layers to consider the SCell to be in deactivated state.

In LTE rel-15, a new intermediate state (i.e., dormant state) between the deactivated and active state has been introduced for enhanced uplink (UL) operation. A MAC Control Element (MAC CE) can be used to change the SCell state between the three states as shown, for example, in FIG. 2. There are also timers in MAC to move a cell between deactivated/activated/dormant. These timers are:

sCellHibernationTimer; which moves the SCell from activated state to dormant state, sCellDeactivationTimer; which moves the SCell from activated state to deactivated state, dormantSCellDeactivationTimer; which moves the SCell from dormant state to deactivated state.

The MAC level SCell activation takes in the order of 20-30 ms. The transitions between Configured and Deactivated are handled by RRC. The transitions between Deactivated, Activated, and Dormant states are handled by MAC. The Dormant state is available in LTE but not yet in new radio (NR). The action of moving to Dormant is called Hybernation.

Once the network understands the need to configure and/or activate CA, the question is which cells to initially configure and/or activate, if they are configured, and/or whether a cell/carrier is good enough in terms of radio quality/coverage (e.g., reference signal received power (RSRP) and reference signal received quality (RSRQ)). To understand the conditions on SCell(s) or potential SCell(s) in a given available carrier the network may configure the UE to perform radio resource management (RRM) measurements.

Typically, the network may be assisted by RRM measurements to be reported by a UE. The network may configure the UE with measurement IDs associated to reportConfig with event A1 (Serving becomes better than threshold) in case this is a configured SCell, or A4 (Neighbor becomes better than threshold) for carriers without a configured SCell as shown in FIG. 3. The measurement objects are associated to the carrier the network wants reports on. If the network is aware of the exact cells it wants the UE to measure, a so-called white cell list can be configured in the measurement object so that the UE is only required to measure these cells in that carrier.

With the later introduction of Dual Connectivity in Rel-12, it became possible to add what is called SCG (Secondary Cell Group) configuration to the UE. The main benefit is that the UE could in principle add a cell from another eNodeB. Protocol wise, that would require different MAC entities, one for each cell group. The UE will have two cell groups, one associated to the PCell (master node) and another associated to a PScell (of the secondary eNodeB), where each group may possibly have their own associated SCells.

5G (5th generation) in 3GPP (3rd generation partnership project) introduces both a new core network (5GC) and a new radio (NR) access network. The core network, 5GC, will however, also support other radio access technologies (RATs) than NR. It has been agreed that long term evolution (LTE) (or evolved-universal terrestrial radio access (E-UTRA)) should also be connected to 5GC. LTE base stations (eNBs) that are connected to 5GC is called ng-eNB and is part of NG-RAN which also consist of NR base stations called gNBs. FIG. 4 shows how the base stations are connected to each other and the nodes in 5GC.

There are different ways to deploy 5G network with or without interworking with LTE (also referred to as E-UTRA) and evolved packet core (EPC), as depicted in FIG. 5. In principle, NR and LTE can be deployed without any interworking, denoted by NR stand-alone (SA) operation, that is gNB in NR can be connected to 5G core network (5GC) and eNB can be connected to EPC with no interconnection between the two (Option 1 and Option 2 in FIG. 5).

On the other hand, the first supported version of NR is the so-called EN-DC (evolved-universal terrestrial radio access (E-UTRAN)-NR Dual Connectivity), illustrated by Option 3. In such a deployment, dual connectivity between NR and LTE is applied with LTE as the master and NR as the secondary node. The RAN node (gNB) supporting NR, may not have a control plane connection to core network (EPC), instead it relies on the LTE as master node (MeNB). This is also called as "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options are also valid. As mentioned above, option 2 supports stand-alone NR deployment where gNB is connected to 5GC. Similarly, LTE can also be connected to 5GC using option 5 (also known as enhanced LTE (eLTE), E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that, Option 4 and option 7 are other variants of dual connectivity between LTE and NR that have been standardized as part of NG-RAN connected to 5GC, denoted by MR-DC (Multi-Radio Dual Connectivity). Under the MR-DC umbrella, we have:

- EN-DC (Option 3): LTE is the master node and NR is the secondary (EPC CN employed)
- NE-DC (Option 4): NR is the master node and LTE is the secondary (5GCN employed)
- NGEN-DC (Option 7): LTE is the master node and NR is the secondary (5GCN employed)
- NR-DC (variant of Option 2): Dual connectivity where both the master and secondary are NR (5GCN employed).

As migration for these options may differ from different operators, it is possible to have deployments with multiple options in parallel in the same network e.g. there could be eNB base station supporting option 3, 5 and 7 in the same network as NR base station supporting 2 and 4. In combination with dual connectivity solutions between LTE and NR it is also possible to support CA (Carrier Aggregation) in each cell group (i.e., master cell group (MCG) and secondary cell group (SCG)) and dual connectivity between nodes on same RAT (e.g. NR-NR DC). For the LTE cells, a consequence of these different deployments is the co-existence of LTE cells associated to eNBs connected to EPC, 5GC or both EPC/5GC.

As the use case of UEs with burst traffic constantly being suspended and resuming in the same cell is quite typical, 3GPP has standardized a solution in LTE and NR to enable the UE to assist the network with measurements performed while the UE is in RRC_IDLE or RRC_INACTIVE so that the network could speed up the setup of carrier aggregation or dual connectivity. That solution in described below.

In 3GPP Rel-16 it is possible to configure a UE either in LTE or in NR to report so called early measurements upon the transition from idle or inactive to connected state. These measurements are performed by the UE in idle or inactive state according to a configuration provided by the source cell. The UE then reports these measurement results to the network during or immediately after entering RRC_CONNECTED state. In this way, the network gets the relevant measurement information in order to determine whether the UE is in coverage for CA or DC operation and can quickly setup CA and/or other forms of DC (e.g., EN-DC, MR-DC, etc.) without the need to first provide a measurement configuration (measConfig) in RRC_CONNECTED, as shown in previous sections, and wait for hundreds of milliseconds until first samples are collected, monitored and then the first reports are triggered and transmitted to the network.

This is also described in 3GPP TS 38.300 v16.4.0:

Network may request the UE to measure NR and/or E-UTRA carriers in RRC_IDLE or RRC_INACTIVE via system information or via dedicated measurement configuration in RRCRelease. If the UE was configured to perform measurements of NR and/or E-UTRA carriers while in RRC_IDLE, it may provide an indication of the availability of corresponding measurement results to the gNB in the RRCSetupComplete message. The network may request the UE to report those measurements after security activation. The request for the measurements can be sent by the network immediately after transmitting the Security Mode Command (i.e., before the reception of the Security Mode Complete from the UE).

If the UE was configured to perform measurements of NR and/or E-UTRA carriers while in RRC_INACTIVE, the gNB can request the UE to provide corresponding measurement results in the RRCResume message and then the UE can include the available measurement results in the RRCResumeComplete message. Alternatively, the UE may provide an indication of the availability of the measurement results to the gNB in the RRCResumeComplete message and the gNB can then request the UE to provide these measurement results.

In 3GPP TS 38.331, early measurement results for NR cells are reported in MeasResultIdleNR-r16, which contains a single entity of serving cell measurements (for the PCell) and an optional list of measurement results for neighbouring NR frequencies/cells (for CA and/or DC). For example, an example illustrating an optional list of measurement results for neighboring NR frequencies/cells described in 38.331 v16.3.1, 6.3.2 is shown below:

```
MeasResultIdleNR-r16 ::=    SEQUENCE {
  measResultServingCell-r16 SEQUENCE {
    rsrp-Result-r16            RSRP-Range                           OPTIONAL,
    rsrq-Result-r16            RSRQ-Range                           OPTIONAL,
    resultsSSB-Indexes-r16       ResultsPerSSB-IndexList-r16          OPTIONAL
  },
  measResultsPerCarrierListIdleNR-r16 SEQUENCE (SIZE (1.. maxFreqIdle-r16)) OF
MeasResultsPerCarrierIdleNR-r16    OPTIONAL,
  ...
}
MeasResultsPerCarrierIdleNR-r16 ::=    SEQUENCE {
  carrierFreq-r16                   ARFCN-ValueNR,
  measResultsPerCellListIdleNR-r16      SEQUENCE (SIZE (1..maxCellMeasIdle-r16)) OF
MeasResultsPerCellIdleNR-r16,
  ...
}
```

-continued

```
MeasResultsPerCellIdleNR-r16 ::=   SEQUENCE {
  physCellId-r16                    PhysCellId,
  measIdleResultNR-r16                SEQUENCE {
    rsrp-Result-r16                   RSRP-Range                    OPTIONAL,
    rsrq-Result-r16                   RSRQ-Range                    OPTIONAL,
    resultsSSB-Indexes-r16              ResultsPerSSB-IndexList-r16         OPTIONAL
  },
  ...
}
ResultsPerSSB-IndexList-r16 ::=   SEQUENCE (SIZE (1.. maxNrofIndexesToReport)) OF
ResultsPerSSB-IndexIdle-r16
ResultsPerSSB-IndexIdle-r16 ::=   SEQUENCE {
  ssb-Index-r16                     SSB-Index,
  ssb-Results-r16                     SEQUENCE {
    ssb-RSRP-Result-r16                 RSRP-Range                    OPTIONAL,
    ssb-RSRQ-Result-r16                 RSRQ-Range                    OPTIONAL
  }                                                                   OPTIONAL
}
```

The early measurement configuration for a neighbouring NR frequency (in MeasIdleCarrierNR-r16) includes, among others, the measurement quantities (reportQuantities) as well as the beam level measurements/reports (BeamMeasConfigIdle-NR-r16) to be applied for that frequency. These parameters can thus be configured individually per frequency. Example parameters configured individually per frequency described in 38.331 v16.3.1, 6.3.2 as shown below:

```
-- ASN1START
-- TAG-MEASIDLECONFIG-START
MeasIdleConfigSIB-r16 ::= SEQUENCE {
  measIdleCarrierListNR-r16                 SEQUENCE (SIZE (1..maxFreqIdle-r16)) OF
MeasIdleCarrierNR-r16               OPTIONAL,   -- Need S
  measIdleCarrierListEUTRA-r16                 SEQUENCE (SIZE (1..maxFreqIdle-r16)) OF
MeasIdleCarrierEUTRA-r16               OPTIONAL,   -- Need S
  ...
}
MeasIdleConfigDedicated-r16 ::= SEQUENCE {
  measIdleCarrierListNR-r16                 SEQUENCE (SIZE (1..maxFreqIdle-r16)) OF
MeasIdleCarrierNR-r16               OPTIONAL,   -- Need N
  measIdleCarrierListEUTRA-r16                 SEQUENCE (SIZE (1..maxFreqIdle-r16)) OF
MeasIdleCarrierEUTRA-r16               OPTIONAL,   -- Need N
  measIdleDuration-r16               ENUMERATED{sec10, sec30, sec60, sec120, sec180, sec240,
sec300, spare},
  validityAreaList-r16               ValidityAreaList-r16                OPTIONAL,   -- Need N
  ...
}
ValidityAreaList-r16 ::= SEQUENCE (SIZE (1..maxFreqIdle-r16)) OF ValidityArea-r16
ValidityArea-r16 ::=               SEQUENCE {
  carrierFreq-r16                  ARFCN-ValueNR,
  validityAreaList-r16               ValidityCellList                 OPTIONAL   -- Need N
}
ValidityCellList ::= SEQUENCE (SIZE (1.. maxCellMeasIdle-r16)) OF PCI-Range
MeasIdleCarrierNR-r16 ::=             SEQUENCE {
  carrierFreq-r16                  ARFCN-ValueNR,
  ssbSubcarrierSpacing-r16               SubcarrierSpacing,
  frequencyBandList                  MultiFrequencyBandListNR
OPTIONAL,   -- Need R
  measCellListNR-r16                  CellListNR-r16                 OPTIONAL,   -- Need R
  reportQuantities-r16               ENUMERATED {rsrp, rsrq, both},
  qualityThreshold-r16               SEQUENCE {
    idleRSRP-Threshold-NR-r16              RSRP-Range             OPTIONAL,   -- Need R
    idleRSRQ-Threshold-NR-r16              RSRQ-Range             OPTIONAL   -- Need R
  }                                                       OPTIONAL,   -- Need R
  ssb-MeasConfig-r16                 SEQUENCE {
    nrofSS-BlocksToAverage-r16                 INTEGER (2..maxNrofSS-BlocksToAverage)
OPTIONAL,   -- Need S
    absThreshSS-BlocksConsolidation-r16 ThresholdNR                  OPTIONAL,   -- Need S
    smtc-r16                        SSB-MTC                      OPTIONAL,   -- Need S
    ssb-ToMeasure-r16                   SSB-ToMeasure             OPTIONAL,   -- Need S
    deriveSSB-IndexFromCell-r16                 BOOLEAN,
```

-continued

```
    ss-RSSI-Measurement-r16                    SS-RSSI-Measurement            OPTIONAL,    -- Need S
  }                                                       OPTIONAL,    -- Need S
  beamMeasConfigIdle-r16                 BeamMeasConfigIdle-NR-r16             OPTIONAL,    -- Need R
  ...
}
MeasIdleCarrierEUTRA-r16 ::=             SEQUENCE {
  carrierFreqEUTRA-r16                   ARFCN-ValueEUTRA,
  allowedMeasBandwidth-r16                 EUTRA-AllowedMeasBandwidth,
  measCellListEUTRA-r16                  CellListEUTRA-r16                     OPTIONAL,    -- Need R
  reportQuantitiesEUTRA-r16                ENUMERATED {rsrp, rsrq, both},
  qualityThresholdEUTRA-r16                SEQUENCE {
    idleRSRP-Threshold-EUTRA-r16                 RSRP-RangeEUTRA               OPTIONAL,    -- Need R
    idleRSRQ-Threshold-EUTRA-r16                 RSRQ-RangeEUTRA-R16           OPTIONAL    -- Need R
  }                                                                      OPTIONAL,    -- Need S
  ...
}
CellListNR-r16 ::=   SEQUENCE (SIZE (1..maxCellMeasIdle-r16)) OF PCI-Range
CellListEUTRA-r16 ::=   SEQUENCE (SIZE (1..maxCellMeasIdle-r16)) OF EUTRA-
PhysCellIdRange
BeamMeasConfigIdle-NR-r16 ::=              SEQUENCE {
  reportQuantityRS-Indexes-r16             ENUMERATED {rsrp, rsrq, both},
  maxNrofRS-IndexesToReport-r16                INTEGER (1.. maxNrofIndexesToReport),
  includeBeamMeasurements-r16                BOOLEAN
}
RSRQ-RangeEUTRA-r16 ::=   INTEGER (−30..46)
-- TAG-MEASIDLECONFIG-STOP
      -- ASN1STOP
```

The procedure in 38.331, 5.7.8.2a however includes that the serving cell measurements are derived and stored once for each neighboring NR frequency for which the UE performs (and stores) measurements. This is not the intended behavior and it would mean that the serving cell measurements then (for each frequency) are derived and stored according to the configured reportQuantities for that specific frequency.

For example, 38.331 v16.3.1, 5.7.8.2a describes:

2> if the VarMeasIdleConfig includes the measIdleCarrierListNR and the session information block 1 (SIB1) contains idleModeMeasurementsNR:
 3> for each entry in measIdleCarrierListNR within VarMeasIdleConfig that contains ssb-MeasConfig:
  4> if UE supports carrier aggregation or NR-DC between serving carrier and the carrier frequency and subcarrier spacing indicated by carrierFreq and ssbSubCarrierSpacing within the corresponding entry:
   5> perform measurements in the carrier frequency and subcarrier spacing indicated by carrierFreq and ssbSubCarrierSpacing within the corresponding entry;
   5> if the reportQuantities is set to rsrq:
    6> consider RSRQ as the cell sorting quantity;
   5> else:
    6> consider RSRP as the cell sorting quantity;
   5> if the measCellListNR is included:
    6> consider cells identified by each entry within the measCellListNR to be applicable for idle/inactive measurement reporting;
   5> else:
    6> consider up to maxCellMeasIdle strongest identified cells, according to the sorting quantity, to be applicable for idle/inactive measurement reporting;
   5> for all cells applicable for idle/inactive measurement reporting and for the serving cell, derive cell measurement results for the measurement quantities indicated by reportQuantities;
   5> store the derived cell measurement results as indicated by report Quantities for the serving cell within measResultServingCell in the measReportIdleNR in VarMeasIdleReport;
   5> store the derived cell measurement results as indicated by report Quantities for cells applicable for idle/inactive measurement reporting within measResultsPerCarrierListIdleNR in the measReportIdleNR in VarMeasIdleReport in decreasing order of the cell sorting quantity, i.e. the best cell is included first, as follows:
    6> if qualityThreshold is configured:
     7> include the measurement results from the cells applicable for idle/inactive measurement reporting whose RSRP/RSRQ measurement results are above the value(s) provided in qualityThreshold;
    6> else:
     7> include the measurement results from all cells applicable for idle/inactive measurement reporting;
   5> if beamMeasConfigIdle is included in the associated entry in measIdleCarrierListNR, for each cell in the measurement results:
    6> derive beam measurements based on S S/PBCH (synchronization signal/physical broadcast channel) block for each measurement quantity indicated in reportQuantityRS-Indexes, as described in TS 38.215 [9];
    6> if the reportQuantityRS-Indexes is set to rsrq:
     7> consider RSRQ as the beam sorting quantity;
    6> else:
     7> consider RSRP as the beam sorting quantity;
    6> set resultsSSB-Indexes to include up to maxNrofRS-IndexesToReport SS/PBCH block indexes in order of decreasing beam sorting quantity as follows:
     7> include the index associated to the best beam for the sorting quantity and if absThreshSS- BlocksConsolidation is included, the remaining beams whose sorting quantity is above absThreshSS-BlocksConsolidation;

6> if the includeBeamMeasurements is set to true:

7> include the beam measurement results as indicated by reportQuantityRS-Indexes.

As seen in the procedural text above from 38.331 v16.3.1, 5.7.8.2a, the UE will report beam level results for each neighboring NR frequency for which the UE performs early measurements and for which beamMeasConfigIdle is included. The UE then includes a list of up to maxNrofRS-IndexesToReport SS/PBCH block indexes in order of decreasing beam sorting. The sorting is done based on the value of reportQuantityRS-Indexes, whereby the beam level results are sorted either by RSRQ, if set to rsrq, or by RSRP, if set to rsrp or both. If includeBeamMeasurements in the beam level configuration is set to true, the UE includes beam measurement results according to the indicated reportQuantityRS-Indexes, i.e., for RSRP, RSRQ or both, in the early measurement results.

SUMMARY

A problem is that for the early measurements that are performed by a UE that is in RRC_IDLE or RRC_INACTIVE, and which then are reported to the network when the UE transitions to (or has transitioned to) RRC_CONNECTED in NR, there is no configuration for how to derive and report beam level information for the serving cell. In the early measurement configuration, there is a beam level configuration per neighbouring NR frequency, in the corresponding beamMeasConfigIdle-r16, which includes what measurement quantities to use for the beam measurements, a maximum number of beams to report and an indication whether to include beam measurement results according to the configured measurement quantities. Since there is no corresponding configuration for beam level measurements and reporting for the serving cell it is however ambiguous whether the UE should report beam level measurements at all for the serving cell and, in that case, how they should be reported.

It is thus not clear for the UE whether it should derive and report any measurements on beam level for the serving cell. If the UE anyway decides to do so it is not clear what configuration to use for the corresponding beam level report. This may, for example, lead to a situation in which the UE does not provide any beam level report for the serving cell in the early measurement report even though the network would need it. The information would then be missing for the network, which could negatively impact the usefulness of the early measurement report.

This may also lead to a situation in which the UE does provide a beam level report for the serving cell in the early measurement report, but the network does not know what configuration it is based on, e.g., what measurement quantity that the UE has used. The network might then misinterpret the received measurement information, which may lead to faulty assumptions and decisions. Further, in some situations, the UE does provide a beam level report for the serving cell in the early measurement report even though the network does not need it. The UE would then transmit measurement information to the network in vain, which would lead to unnecessary utilization of UL resources (and power consumption).

According to some embodiments, a method of operating a communication device in a communication network includes receiving, while operating in an idle state, a connected state, or an inactive state, an early measurement configuration to perform an early measurement for reporting to the communication network, wherein the early measurement configuration includes a configuration to perform a beam level measurement for a serving cell. The method includes performing the early measurement including the beam level measurement for the serving cell while operating in the idle state or the inactive state. The method includes reporting an early measurement result including the beam level measurement for the serving cell to the communication network upon the communication device transitioning to the connected state.

Analogous apparatus, computer programs, and computer program products are provided.

Advantages that may be achieved is that the network is enabled to indicate to the UE whether to, and in that case how to, derive and report early measurements on beam level for the serving cell. There is then no ambiguity for the UE how those beam level measurements should be derived and reported for the serving cell. This allows the network to make sure that the UE reports early measurements for the serving cell that are relevant, e.g. regarding whether it is needed or not from the UE in this specific case, in that case whether to only indicate which are the strongest beams or to also include actual measured values as well, the number of beams to include in the measurement report and what quality threshold to use to determine if a beam should be reported or not.

According to some other embodiments, a method of operating a network node in a communication network includes transmitting, to a user equipment, UE, a configuration to perform a beam level measurement for a serving cell. The method includes receiving a beam level measurement result for the serving cell.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
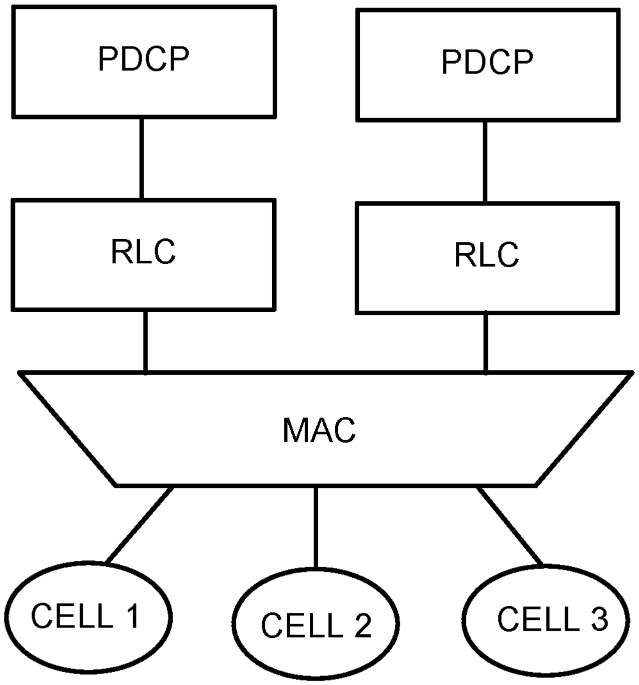
FIG. 1 is a block diagram of example cells aggregated on a MAC-level.
Figure 2:
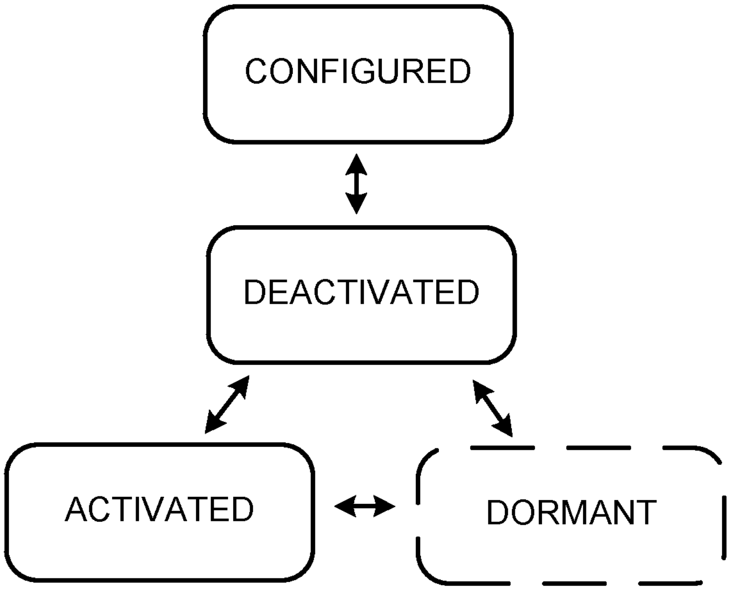
FIG. 2 is a block diagram of MAC level states in LTE.
Figure 3:
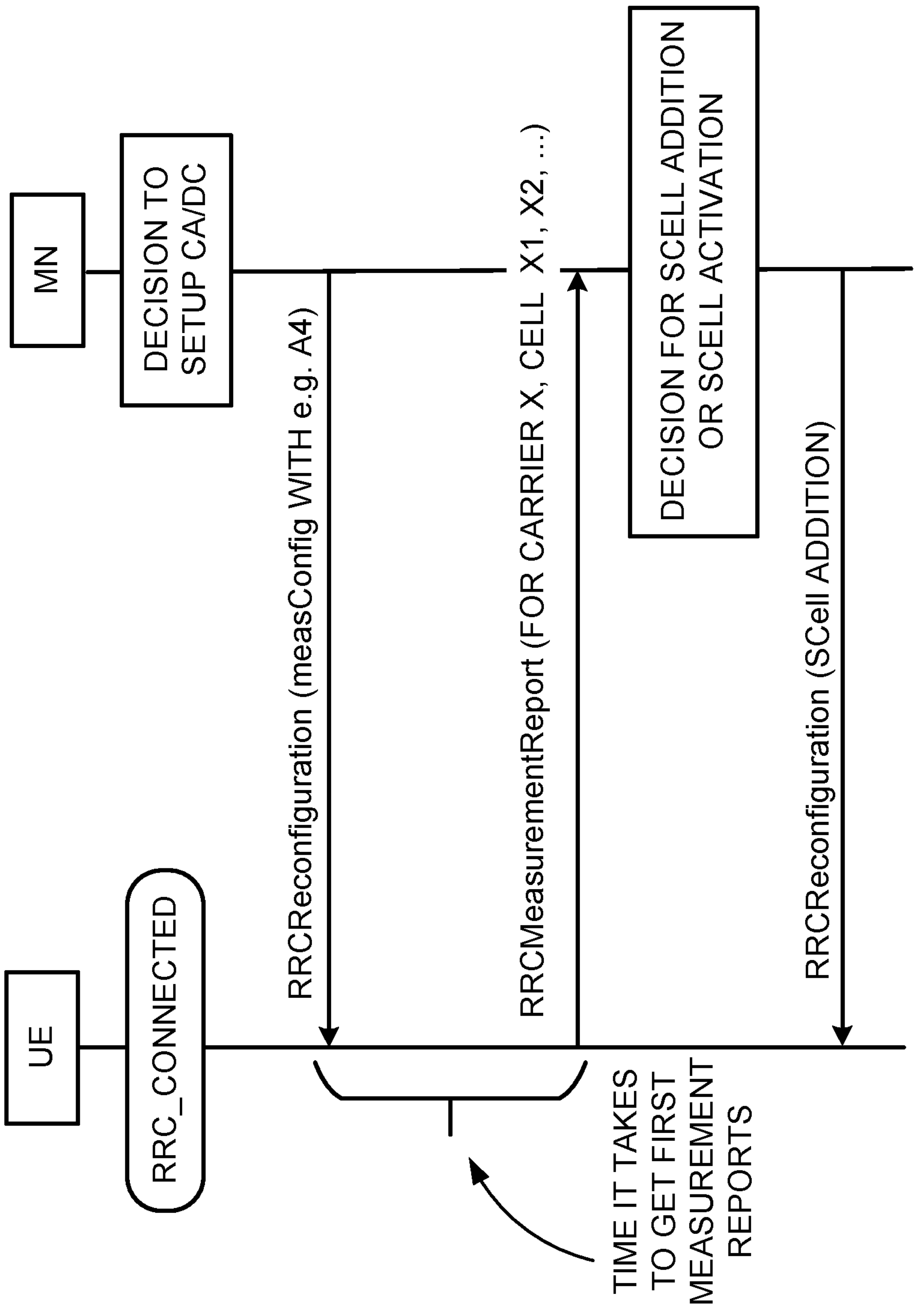
FIG. 3 is a block diagram of an example mobile network configuring a UE with measurement IDs.
Figure 4:
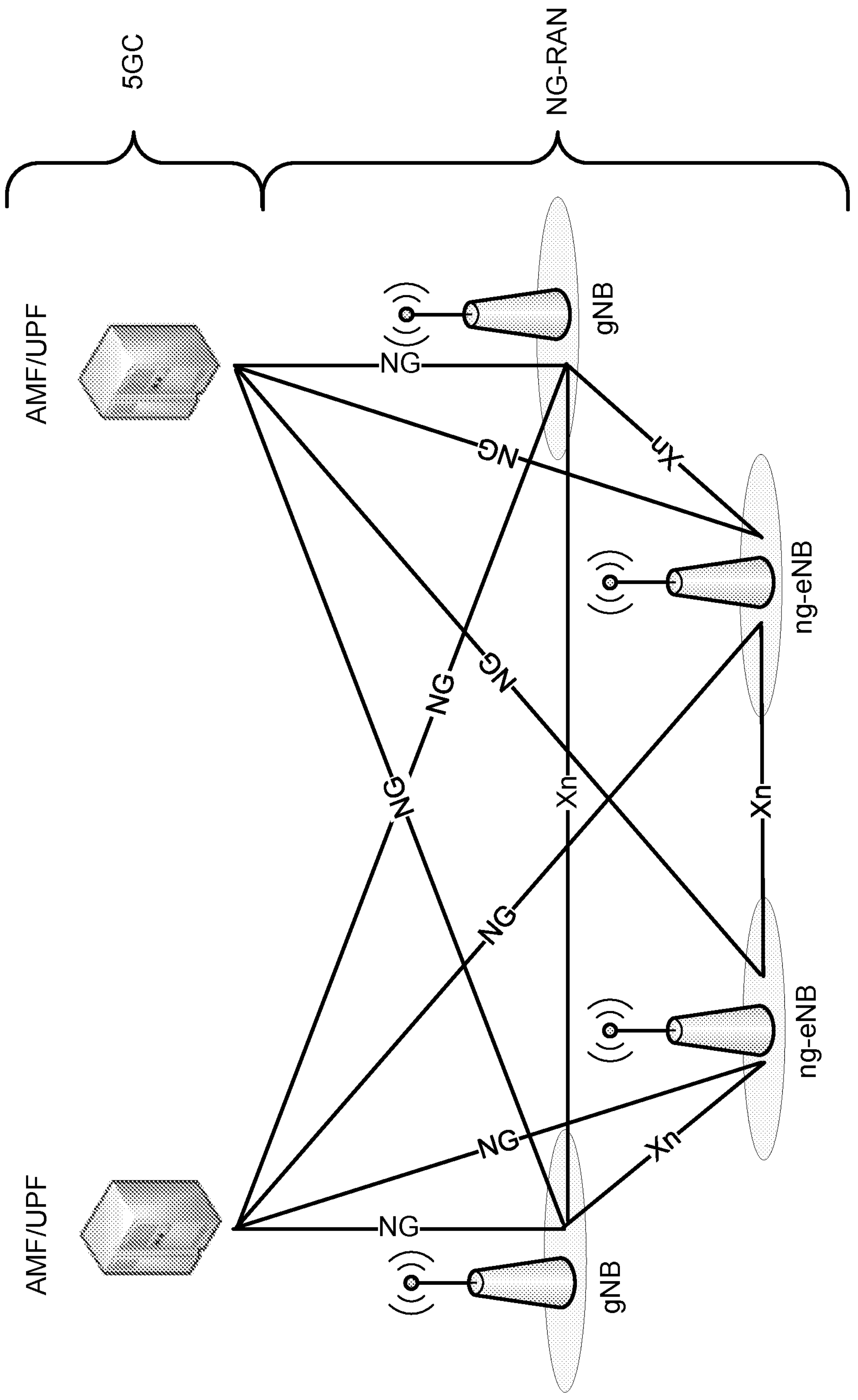
FIG. 4 is a diagram of an example base stations connected to each other and other nodes in 5GC.
Figure 5:
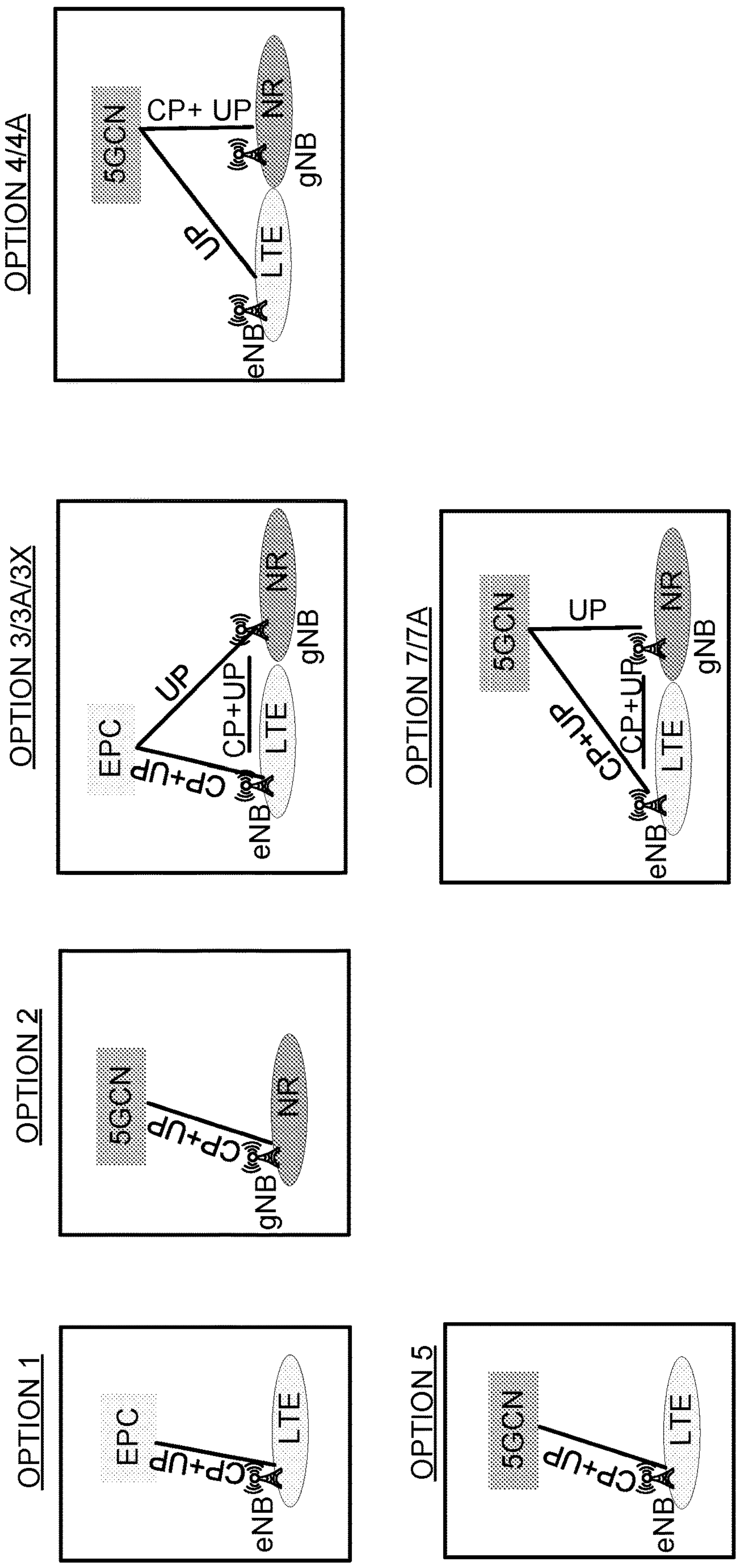
FIG. 5 is a diagram of example LTE and NR interworking options in 3GPP.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

One problem addressed in the present disclosure is that for the early measurements that are performed by a UE that is in RRC_IDLE or RRC_INACTIVE, and which then are reported to the network when the UE transitions to (or has transitioned to) RRC_CONNECTED in NR, there is no configuration for how to derive and report beam level information for the serving cell. In the early measurement configuration, there is a beam level configuration per neighbouring NR frequency, in the corresponding beamMeasConfigIdle-r16, which includes what measurement quantities to use for the beam measurements, a maximum number of beams to report and an indication whether to include beam measurement results according to the configured measurement quantities. Since there is no corresponding configuration for beam level measurements and reporting for the serving cell it is however ambiguous whether the UE should report beam level measurements at all for the serving cell and, in that case, how they should be reported.

It can be noted that in a typical case, the serving cell (where the UE is camping) is on a lower frequency band on FR1 whereas the configured early measurements are for CA/DC candidates on higher frequencies, typically on FR2. As an example, up to 64 beams are supported on FR2 whereas only 4 or 8 beams are supported on FR1. The configuration for beam level measurements would therefore typically differ between the serving cell and the configured neighbouring NR frequencies and it would thus not be relevant to reuse the beam level configuration for a neighbouring frequency for the serving cell. It can also be noted that in case a UE is configured with early measurements only for NE-DC, i.e., with no neighbouring NR frequencies, there would not be any beam level measurement configuration available at all, even though the UE should include measurements for the serving NR cell.

It is thus not clear for the UE whether it should derive and report any measurements on beam level for the serving cell. If the UE anyway decides to do so it is not clear what configuration to use for the corresponding beam level report. This may, for example, lead to a situation in which the UE does not provide any beam level report for the serving cell in the early measurement report even though the network would need it. The information would then be missing for the network, which could negatively impact the usefulness of the early measurement report.

This may also lead to a situation in which the UE does provide a beam level report for the serving cell in the early measurement report, but the network does not know what configuration it is based on, e.g., what measurement quantity that the UE has used. The network might then misinterpret the received measurement information, which may lead to faulty assumptions and decisions. Further, in some situations, the UE does provide a beam level report for the serving cell in the early measurement report even though the network does not need it. The UE would then transmit measurement information to the network in vain, which would lead to unnecessary utilization of UL resources (and power consumption).

Figure 6:
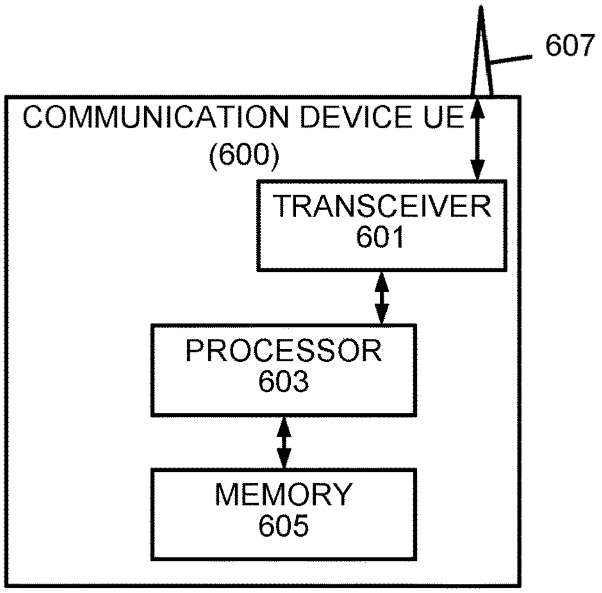
FIG. 6 is a block diagram illustrating a communication device UE according to some embodiments of inventive concepts.

FIG. 6 is a block diagram illustrating elements of a communication device UE 600 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 600 may be provided, for example, as discussed below with respect to wireless device 1110 of FIG. 11, UE 1200 of FIG. 12, UEs 1591, 1592 of FIG. 15, and/or UE 1530 of FIG. 15.) As shown, communication device UE may include an antenna 607 (e.g., corresponding to antenna 1111 of FIG. 11), and transceiver circuitry 601 (also referred to as a transceiver, e.g., corresponding to interface 1114 of FIG. 11) including a transmitter and a receiver configured to provide uplink and downlink radio communications with a base station(s) (e.g., corresponding to network node 1160 of FIG. 11, also referred to as a RAN node) of a radio access network. Communication device UE may also include processing circuitry 603 (also referred to as a processor, e.g., corresponding to processing circuitry 1120 of FIG. 11) coupled to the transceiver circuitry, and memory circuitry 605 (also referred to as memory, e.g., corresponding to device readable medium 1130 of FIG. 11) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that separate memory circuitry is not required. Communication device UE may also include an interface (such as a user interface) coupled with processing circuitry 603, and/or communication device UE may be incorporated in a vehicle.

As discussed herein, operations of communication device UE may be performed by processing circuitry 603 and/or transceiver circuitry 601. For example, processing circuitry 603 may control transceiver circuitry 601 to transmit communications through transceiver circuitry 601 over a radio interface to a radio access network node (also referred to as a base station) and/or to receive communications through transceiver circuitry 601 from a RAN node over a radio interface. Moreover, modules may be stored in memory circuitry 605, and these modules may provide instructions so that when instructions of a module are executed by processing circuitry 603, processing circuitry 603 performs respective operations (e.g., operations discussed below with respect to Example Embodiments relating to wireless communication devices). According to some embodiments, a communication device UE 600 and/or an element(s)/function(s) thereof may be embodied as a virtual node/nodes and/or a virtual machine/machines.

Figure 7:
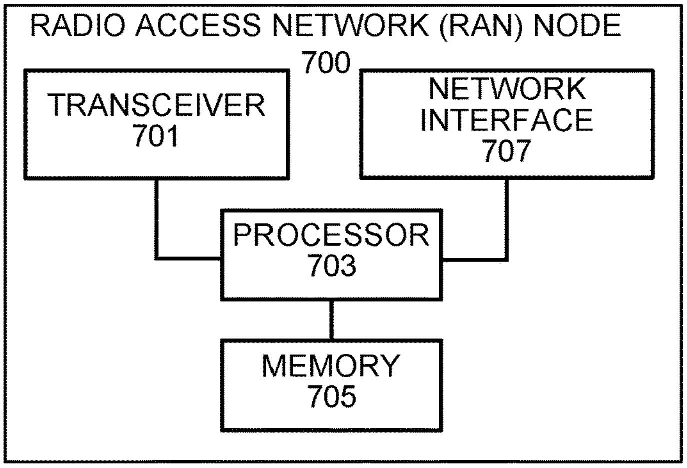
FIG. 7 is a block diagram illustrating a radio access network RAN node (e.g., a base station eNB/gNB) according to some embodiments of inventive concepts.

FIG. 7 is a block diagram illustrating elements of a radio access network RAN node 700 (also referred to as a network node, base station, eNodeB/eNB, gNodeB/gNB, etc.) of a Radio Access Network (RAN) configured to provide cellular communication according to embodiments of inventive concepts. (RAN node 700 may be provided, for example, as discussed below with respect to network node 1160 of FIG. 11, base stations 1512A, 1512B, 1512C of FIG. 15, and/or base station 1520 of FIG. 15.) As shown, the RAN node may include transceiver circuitry 701 (also referred to as a transceiver, e.g., corresponding to portions of interface 1190 of FIG. 11) including a transmitter and a receiver configured to provide uplink and downlink radio communications with mobile terminals. The RAN node may include network interface circuitry 707 (also referred to as a network interface, e.g., corresponding to portions of interface 1190 of FIG. 11) configured to provide communications with other nodes (e.g., with other base stations) of the RAN and/or core network CN. The network node may also include processing circuitry 703 (also referred to as a processor, e.g., corresponding to processing circuitry 1170 OF FIG. 11) coupled to the transceiver circuitry, and memory circuitry 705 (also referred to as memory, e.g., corresponding to device readable medium 1180 of FIG. 11) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the RAN node may be performed by processing circuitry 703, network interface 707, and/or transceiver 701. For example, processing circuitry 703 may control transceiver 701 to transmit downlink communications through transceiver 701 over a radio interface to one or more mobile terminals UEs and/or to receive uplink communications through transceiver 701 from one or more mobile terminals UEs over a radio interface. Similarly, processing circuitry 703 may control network interface 707 to transmit communications through network interface 707 to one or more other network nodes and/or to receive communications through network interface from one or more other network nodes. Moreover, modules may be stored in memory 705, and these modules may provide instructions so that when instructions of a module are executed by processing circuitry 703, processing circuitry 703 performs respective operations (e.g., operations discussed below with respect to Example Embodiments relating to RAN nodes). According to some embodiments, RAN node 700 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 8:
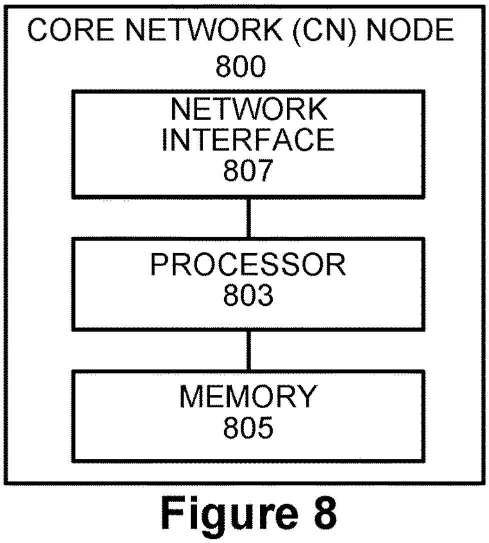
FIG. 8 is a block diagram illustrating a core network CN node (e.g., an AMF node, an SMF node, etc.) according to some embodiments of inventive concepts.

FIG. 8 is a block diagram illustrating elements of a core network CN node (e.g., an SMF node, an AMF node, etc.) of a communication network configured to provide cellular communication according to embodiments of inventive concepts. As shown, the CN node may include network interface circuitry 807 (also referred to as a network interface) configured to provide communications with other nodes of the core network and/or the radio access network RAN. The CN node may also include a processing circuitry 803 (also referred to as a processor) coupled to the network interface circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the CN node may be performed by processing circuitry 803 and/or network interface circuitry 807. For example, processing circuitry 503 may control network interface circuitry 807 to transmit communications through network interface circuitry 807 to one or more other network nodes and/or to receive communications through network interface circuitry from one or more other network nodes. Moreover, modules may be stored in memory 805, and these modules may provide instructions so that when instructions of a module are executed by processing circuitry 803, processing circuitry 803 performs respective operations (e.g., operations discussed below with respect to Example Embodiments relating to core network nodes). According to some embodiments, CN node 800 and/or an element(s)/function(s) thereof may be embodied as a virtual node/nodes and/or a virtual machine/machines.

The present disclosure describes methods for configuration of a wireless terminal/user equipment (UE) 600 how to perform and report beam measurements for the serving cell, where the beam measurements are performed in a dormant state (e.g., RRC_IDLE or RRC_INACTIVE) and where the reporting is done upon the transition from a dormant state to connected state. The methods for the configuration include a specific configuration for serving cell beam level measurements is included in the early measurement configuration. In some embodiments, the UE 600 determines whether to perform and report any beam level measurements for the serving cell, and in that case how to derive and report those measurements, based on that configuration.

In some embodiments, the UE 600 includes beam level reporting for the serving cell only if there is a configuration for the serving frequency, which includes beamMeasConfigIdle-r16 in the early measurement configuration. If such configuration exists, the UE 600 determines how to derive and report the beam level measurements for the serving cell based on that configuration. In some embodiments, the UE 600 includes a beam level report for the serving cell if beamMeasConfigIdle-r16 is configured for any of the neighbouring NR frequencies (either for any of all the configured neighbouring NR frequencies, or for any of the configured neighbouring NR frequencies that are part of the same early measurement report), and correspondingly includes the corresponding measurement results per beam if includeBeamMeasurements-r16 is set for any of those neighbouring NR frequencies. The configuration for beam level reporting for the serving cell could then either be hard coded, specified or based on e.g., the corresponding configuration for cell reselection in SIB2, e.g., as defined by nrofSS-BlocksToAverage and absThreshSS-BlocksConsolidation.

The UE 600 includes a beam level report for the serving cell based on the parameters for cell reselection in SIB2. The same number of beams and/or threshold for the beam measurements as defined by nrofSS-BlocksToAverage and absThreshSS-BlocksConsolidation, respectively, in SIB2 are then used, if defined. If e.g., nrofSS-BlocksToAverage is not configured in SIB2, the UE 600 does not include any beam level measurements for the serving cell in early measurement reports that are sent in the cell. In some embodiments, the beam level reporting for the serving cell is based on a specific neighbouring NR frequency configuration, e.g., the first one in the list, in the early measurement configuration. This could then be based on only the dedicated early measurement configuration, only the broadcasted early measurement configuration, or a combination of those.

It is possible for the network to indicate to the UE 600 whether to, and in that case how to, derive and report early measurements on beam level for the serving cell. There is then no ambiguity for the UE 600 how those beam level measurements should be derived and reported for the serving cell. This allows the network to make sure that the UE 600 reports early measurements for the serving cell that are relevant, e.g., regarding whether it is needed or not from the UE 600 in this specific case, in that case whether to only indicate which are the strongest beams or to also include actual measured values as well, the number of beams to include in the measurement report and what quality threshold to use to determine if a beam should be reported or not.

Figure 9:
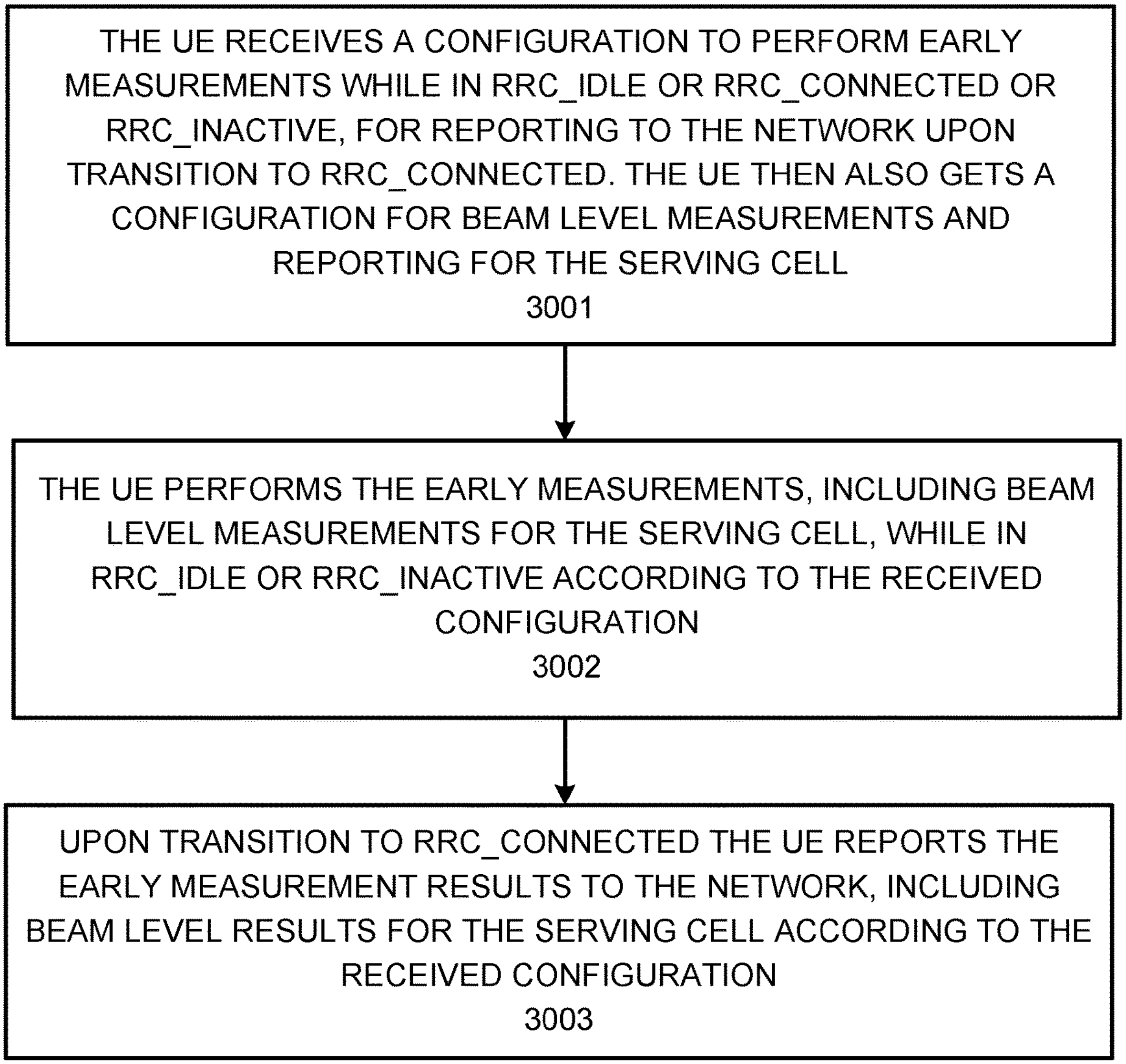
FIG. 9 is a flow diagram illustrating a method according to some embodiments of inventive concepts.

FIG. 9 illustrates a method performed by a UE 600 according to some embodiments of the present disclosure. For example, FIG. 9 illustrates the UE 600 receives 3001 a configuration to perform early measurements while in RRC_IDLE or RRC_CONNECTED or RRC_INACTIVE, for reporting to the network upon transition to RRC_CONNECTED. The UE 600 then also gets a configuration for beam level measurements and reporting for the serving cell. In this step, the configuration is to perform early measurements while in RRC_IDLE or RRC_INACTIVE, for reporting to the network upon transition to RRC_CONNECTED. The configuration includes a configuration for beam level measurements and reporting for the serving cell. The configuration can be provided to the UE 600 either through dedicated signaling, e.g., in the RRC Release message that triggers the UE 600 to transition to RRC_IDLE or RRC_INACTIVE, through broadcast signaling, e.g., system information in NR, or through a combination of these.

FIG. 9 also illustrates the method includes the UE 600 performing 3002 the early measurements, including beam level measurements for the serving cell, while in RRC_IDLE or RRC_INACTIVE according to the received configuration. In this step, the UE 600 performs the early measurements according to the received configuration. This includes performing measurements on beam level for the serving cell.

FIG. 9 further illustrates the method includes the UE 600 reporting 3003, upon transition to RRC_CONNECTED, the early measurement results to the network, including beam level results for the serving cell according to the received configuration. In this step, upon the transition to RRC_CONNECTED in an NR cell (the serving cell), the UE 600 is requested to report the early measurement results to the network, whereby they are sent by the UE 600 to the network (in the serving cell). Based on the configuration that the UE 600 has received in previous steps, the UE 600 determines whether to include beam level results for the serving cell and, in that case, how to derive the beam level results for the serving cell and what to include in the corresponding report.

In another embodiment, the configuration for beam level measurements and reporting for the serving cell is provided to the UE 600 in a separate field or IE in the early measurement configuration. The UE 600 then determines whether to perform and report any beam level measurements for the serving cell based on if it has received this configuration. If the UE 600 has received the configuration, as part of the early measurement configuration, it performs beam level measurements for the serving cell accordingly, i.e., it derives and reports the beam level measurement results for the serving cell according to the received configuration. If the UE 600 has not received the configuration when it is time for reporting of the early measurements, the UE 600 does not include any beam level results for the serving cell in the early measurement report. An example implementation of this alternative can be seen below (with the added parts underlined):

```
-- ASN1START
-- TAG-MEASIDLECONFIG-START
MeasIdleConfigSIB-r16 ::= SEQUENCE {
   measIdleCarrierListNR-r16          SEQUENCE (SIZE (1..maxFreqIdle-r16)) OF
MeasIdleCarrierNR-r16               OPTIONAL,      -- Need S
   measIdleCarrierListEUTRA-r16       SEQUENCE (SIZE (1..maxFreqIdle-r16)) OF
MeasIdleCarrierEUTRA-r16            OPTIONAL,      -- Need S
   ...,
[[
```

-continued

```
beamMeasConfigIdleServing          BeamMeasConfigIdleServing-NR    OPTIONAL
]]
}
MeasIdleConfigDedicated-r16 ::= SEQUENCE {
   measIdleCarrierListNR-r16               SEQUENCE (SIZE (1..maxFreqIdle-r16)) OF
MeasIdleCarrierNR-r16                  OPTIONAL,       -- Need N
   measIdleCarrierListEUTRA-r16            SEQUENCE (SIZE (1..maxFreqIdle-r16)) OF
MeasIdleCarrierEUTRA-r16               OPTIONAL,       -- Need N
   measIdleDuration-r16                    ENUMERATED{sec10, sec30, sec60, sec120,
sec180, sec240, sec300, spare},
   validityAreaList-r16                    ValidityAreaList-r16
OPTIONAL,       -- Need N
   ...,
[[
beamMeasConfigIdleServing          BeamMeasConfigIdleServing-NR    OPTIONAL
]]
}
[...skipped parts...]
```

In another embodiment, the configuration for beam level measurements and reporting for the serving cell is provided to the UE 600 within one of the MeasIdleCarrierNR-r16 entities in measIdleCarrierListNR-r16 that is part of the UE's early measurement configuration. The UE 600 then checks if the serving frequency (i.e., the frequency of the serving cell to which the UE 600 sends the early measurement report upon transition to RRC_CONNECTED) matches the configuration for any of the MeasIdleCarrierNR-r16 entities in the measIdleCarrierListNR-r16, e.g., that the carrierFreq and/or ssbSubCarrierSpacing corresponds to the carrier frequency and/or subcarrier spacing for the serving cell. If that is the case, the UE 600 uses the configuration for that MeasIdleCarrierNR-r16 entity to determine whether to perform and/or include beam level measurements for the serving cell in the early measurement report and, if so, how to derive and report those beam level measurement results. For example, if the matching MeasIdleCarrierNR-r16 entity includes beamMeasConfigIdle-r16, the UE 600 determines that beam level measurements shall be performed and reported for the serving cell. Those beam level measurements are then, in an example, performed according to the configuration included in that beamMeasConfigIdle-r16 and possibly the parameter absThreshSS-BlocksConsolidation-r16 that is included in ssb-MeasConfig-r16 in the same MeasIdleCarrierNR-r16 entity.

In one example, the UE 600 does not include any beam level results for the serving cell if there is no MeasIdleCarrierNR-r16 entity in the measIdleCarrierListNR-r16 of the UE's early measurement configuration that matches the frequency of the serving cell. In case the UE 600 should report beam level measurements for the serving cell, the network thus includes a configuration for the serving frequency (with beamMeasConfigIdle-r16) in measIdleCarrierListNR-r16. It can be observed that in some cases the corresponding MeasIdleCarrierNR-r16 entity thus may be configured by the network only for configuration of beam level measurements/reporting for the serving cell, e.g., since early measurements on the corresponding frequency may not be useful for configuration of CA or DC (where the SCG or SCell(s) are situated on that frequency).

In another embodiment, the UE 600 determines whether it shall derive and/or report beam level measurements for the serving cell based on the content of the configurations for the neighbouring NR frequencies, i.e., in the MeasIdleCarrierNR-r16 entities in the measIdleCarrierListNR-r16. As an example, if any of those entities (i.e., if the early measurement configuration for any of the configured NR neighbouring frequencies) includes a configuration for beam level measurements (beamMeasConfigIdle-r16) then the UE 600 includes a report on beam level also for the serving cell in the early measurement report. In a similar way, the UE 600 determines whether is shall include measurement results (for the related measurement quantity/-ies) for the reported beams for the serving cell. For example, if any of the MeasIdleCarrierNR-r16 entities in the measIdleCarrierListNR-r16 has the includeBeamMeasurements-r16 set, the UE 600 performs the corresponding procedure also for the serving cell and thus includes the measurement results.

In one example, some of the configuration to use for the beam level measurements on the serving cell, e.g., corresponding to reportQuantityRS-Indexes-r16 and maxNrofRS-IndexesToReport-r16 in BeamMeasConfigIdle-NR-r16 and the absThreshSS-BlocksConsolidation-r16 in MeasIdleCarrierNR-r16 consist of hard coded and/or specified values. For example, the number of beams (corresponding to maxNrofRS-IndexesToReport-r16) can be set to a value that is related to the frequency band of the serving frequency. In another example, the configuration is instead based on a configuration for cell (re)selection in system information (e.g., in SIB2). For example, the parameter nrofSS-BlocksToAverage in SIB2 is used for the configuration of maxNrofRS-IndexesToReport-r16 for beam level measurements for the serving cell in the early measurements. In a corresponding way, the parameter absThreshSS-BlocksConsolidation in SIB2 is used to determine a threshold (if any) for the beam level measurement reporting for the serving cell in the early measurements.

In another example, the UE 600 uses the beam level configuration for one of the neighbouring NR frequencies in the early measurement configuration that is configured with beam level measurements (i.e., from one MeasIdleCarrierNR-r16 entity in the measIdleCarrierListNR-r16 that includes beamMeasConfigIdle-r16) to determine the beam level configuration to use for the serving cell. Which neighbouring NR frequency configuration (MeasIdleCarrierNR-r16 entity in the list) to then use the beam level configuration from can e.g., be configured through dedicated or broadcast signaling, specified, hard coded or determined through UE implementation.

In another alternative, the UE 600 determines whether to derive and report any beam level measurements for the serving cell (for the early measurement report) based on the configuration for cell reselection in system information (e.g., SIB2 in NR). In one example, the UE 600 then derives and reports beam level results if nrofSS-BlocksToAverage is defined in SIB2. In that case, the value could then also be used to determine the maximum number of beams to include in the report.

In yet another alternative, the UE 600 determines whether to derive and report any beam level measurements for the serving cell (for the early measurement report) and in that case how to derive and report the beam level results based on one of the configurations for one of the neighbouring NR frequencies in the early measurement configuration (i.e., from one MeasIdleCarrierNR-r16 entity in the measIdleCarrierListNR-r16). The UE 600 then uses the configuration that is related to beam level measurements for that neighbouring NR frequency also to determine whether to and/or how to do beam level measurements for the serving cell.

Which neighbouring NR frequency configuration (MeasIdleCarrierNR-r16 entity in the list) to then use for the configuration of beam level measurements for the serving cell can e.g., be configured through dedicated or broadcast signaling, specified, hard coded or determined through UE implementation. In one example, it is the first in the list that is stored by the UE. In other examples, it may be the first or the last in the list that was received through dedicated signaling or the first or the last in the list that was received through broadcast signaling. It may also be the first entity or the last entity, in a list of configurations, that includes beamMeasConfigIdle-r16, i.e., that actually contains a beam level configuration, if any.

In yet another example, the beam level configuration for the serving cell is based on the corresponding beam level configuration for more than one of the neighbouring NR frequencies, e.g., as a combination of more than one such configuration or that different parts of the beam level configuration are taken from different neighbouring NR frequency configurations. In one example, which configuration(s) for NR neighbouring frequencies to base the beam level measurement configuration for the serving cell on may be selected through a parameter in the neighbouring NR frequency configuration (i.e., within the MeasIdleCarrierNR-r16 entity), e.g., what frequency or frequency band that it concerns. This could then be used so that the serving cell frequency configuration is based on the configuration for an NR neighbouring frequency that e.g., is considered closest to the serving frequency.

In some embodiments, which of the solutions to use in order to determine whether to perform and/or derive and report beam level measurements for the serving cell and, in that case, the corresponding configuration to then use, can be configured by the network through e.g., dedicated or broadcast signaling. As an alternative it can be specified, hard coded or determined through UE implementation.

In the context of the invention what is called beam measurement information may be interpreted as measurement performed on reference signals (such as SSBs or channel state information-reference signal (CSI-RS) resources) that may be beamformed by the network. Beam measurement information may be beam measurements such as RSRP, RSRQ or SINR (signal to interference and noise ratio) per beam (e.g., SS-RSRP, for RSRP performed on a specific SSB) or information derived from beam measurements, such as a list of beam identifiers where these were selected based on beam measurements e.g., identifiers of strongest beams, or beam above a configurable threshold.

Operations of the communication device 600 (implemented using the structure of the block diagram of FIG. 7) will now be discussed with reference to the flow chart of FIG. 11 according to some embodiments of inventive concepts. For example, modules may be stored in memory 305 of FIG. 7, and these modules may provide instructions so that when the instructions of a module are executed by respective communication device processing circuitry 303, processing circuitry 303 performs respective operations of the flow chart.

Figure 10:
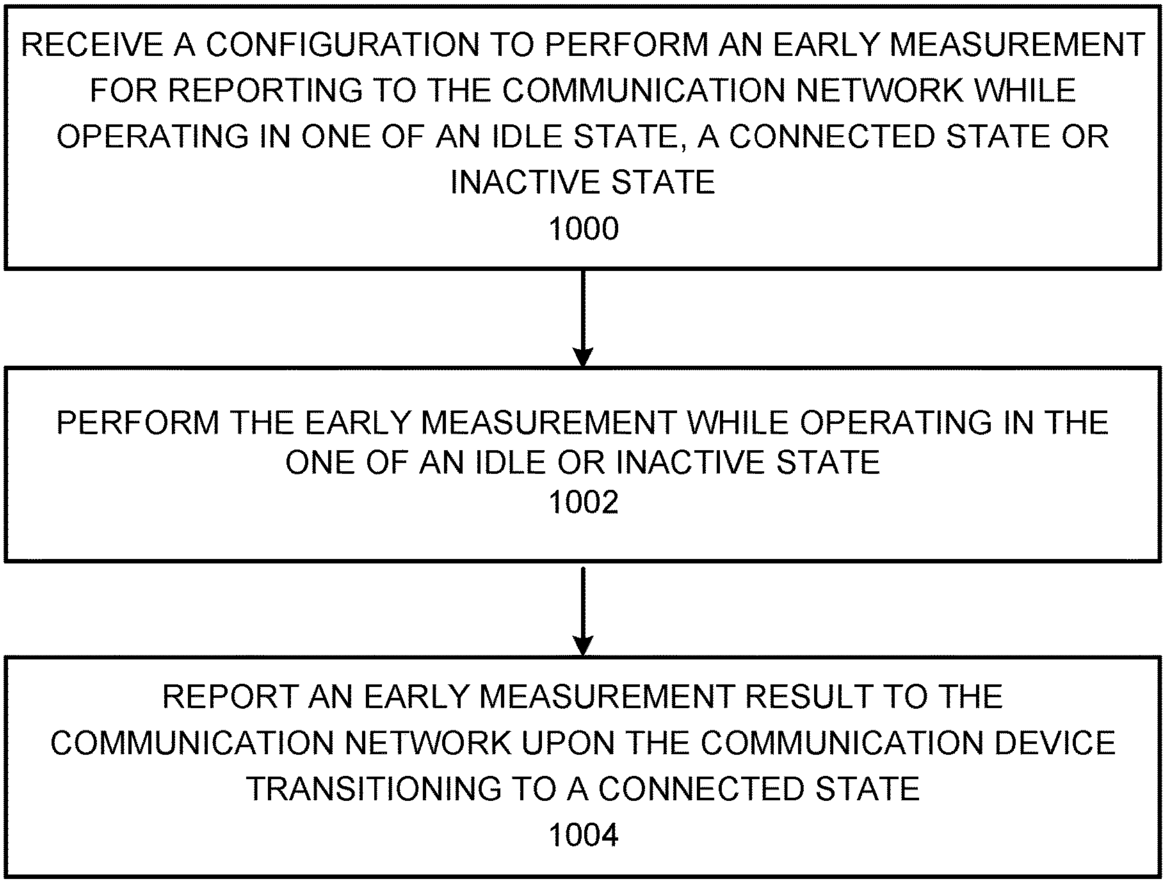
FIG. 10 is a flow chart illustrating operations of a communication UE according to some embodiments of inventive concepts.

FIG. 10 illustrates a method of operating a communication device in a communication network according to embodiments of the present disclosure. FIG. 10 illustrates the method includes receiving 1100, while operating in one of an idle state, a connected state, or an inactive state a configuration to perform an early measurement for reporting to the communication network while operating in one of an idle or an inactive state. In some embodiments, the idle state comprises a Radio Resource Control Idle, RRC_IDLE, and the inactive state comprises a Radio Resource Control Inactive, RRC_INACTIVE, state. For example, communication device 600 receives a configuration to perform an early measurement for reporting to the communication network while operating in one of a RRC_IDLE or a Radio RRC_INACTIVE state. In some embodiments, the method includes receiving the configuration through dedicated signaling, broadcast signaling, or a combination of dedicated and broadcast signaling from the communication network. Additional examples and embodiments regarding dedicated signaling, broadcast signaling, or a combination of dedicated and broadcast signaling of the configuration is discussed above with regards to FIG. 9.

In some embodiments, the early measurement comprises a beam level measurement. In this embodiment, the configuration includes a configuration to perform the beam level measurement and reporting for the serving cell. In some embodiments, the configuration to perform the beam level measurement is provided to the communication device in one of a separate field or an information element (IE) in the early measurement configuration.

According to some embodiments, the configuration to perform the beam level measurement is provided to the communication device in a measurement idle carrier New Radio (NR) entity that is part of the communication device's early measurement configuration. In some embodiments, the method includes determining whether to perform and/or include the beam level measurement for the serving cell in the early measurement report based on a comparison of a serving frequency of the communication device to a configuration of the measurement idle carrier NR entity. For example, communication device 600 determines to perform and/or include the beam level measurement for the serving cell in the early measurement report based on a comparison of a serving frequency of communication device 600 to a configuration of the measurement idle carrier NR entity.

The method includes determining to perform and/or include the beam level measurement for the serving cell in the early measurement report based on a determination the serving frequency of the communication device corresponds to a configuration of the measurement idle carrier NR entity in some embodiments. Alternatively, the method includes determining not to perform and/or include the beam level measurement for the serving cell in the early measurement report based on a determination that the serving frequency of the communication device does not correspond to a configuration of the measurement idle carrier NR entity. Continuing the previous example, communication device 600 determines to perform and/or include the beam level measurement for the serving cell in the early measurement report based on a determination that the serving frequency of communication device 600 corresponds to a configuration of the measurement idle carrier NR entity or determines to not perform and/or include the beam level measurement for the serving cell in the early measurement report based on the determination that the serving frequency of communication device 600 does not correspond to a configuration of the measurement idle carrier NR entity. Additional examples and embodiments regarding the measurement idle carrier NR entity are discussed above with regards to FIG. 9.

In some embodiments, the method includes determining whether to perform and/or include the beam level measurement for the serving cell in the early measurement report based on a comparison of a neighboring NR frequency of the communication device to a configuration of the measurement idle carrier NR entity. In some embodiments, the method includes determining to perform and/or include the beam level measurement for the serving cell in the early measurement report based on a determination the neighboring NR frequency of the communication device corresponds to the configuration of the measurement idle carrier NR entity. For example, communication device 600 determines perform and/or include the beam level measurement for the serving cell in the early measurement report based on a determination the neighboring NR frequency of communication device 600 corresponds to the configuration of the measurement idle carrier NR entity. Alternatively, the configuration to perform the beam level measurement is provided to the communication device in a configuration for cell (re)selection in system information in some embodiments. Additional examples and embodiments regarding neighboring NR frequencies of configuration and cell reselection in system information are discussed above with regards to FIG. 9.

Returning to FIG. 10, the method includes performing 1102 the early measurement while operating in the one of an idle or inactive state and reporting 1104 an early measurement result to the communication network upon the communication device transitioning to a connected state. In some embodiments, the connected state comprises a Radio Resource Control Connected (RRC_CONNECTED) state. For example, communication device 600 performs the early measurement while operating in the one of a RRC_IDLE or RRC_INACTIVE state. In addition, the communication device 600 reports the early measurement result to the communication network upon the communication device transitioning to a RRC_CONNECTED state. In some embodiments, the method includes performing a measurement on a beam level for the serving cell and reporting the beam level measurement result for the serving cell to the network. Additional examples and embodiments regarding performing the early measurement and reporting the early measurement result are discussed above with regards to FIG. 9.

In some embodiments, the configuration includes a configuration for beam level measurement for a neighboring NR frequency in the early measurement configuration. In this embodiment, the method includes performing the early measurement based on the configuration for the neighboring NR frequency. In some embodiments, the method further includes selecting the configuration for the neighboring NR frequency from a list of configurations of several neighboring NR frequencies. For example, communication device 600 selects the neighboring NR frequency from a list of configurations of several neighboring NR frequencies.

Figure 11:
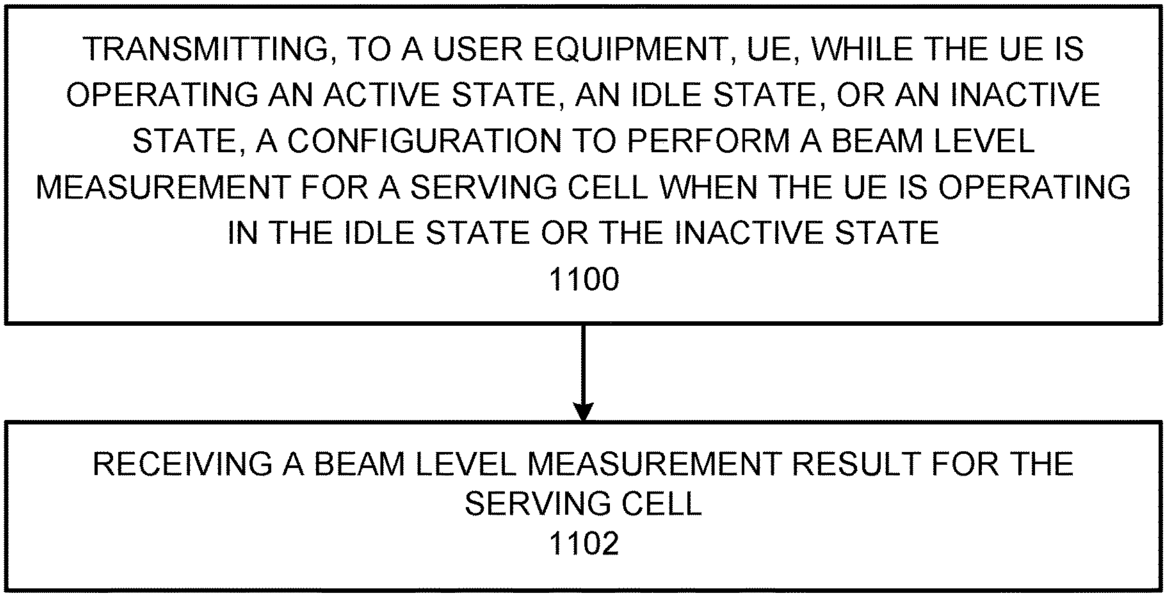
FIG. 11 is a flow chart illustrating operations of a network node according to some embodiments of inventive concepts.

FIG. 11 illustrates a method of operating a network device in a communication network according to embodiments of the present disclosure. FIG. 11 illustrates the method includes transmitting 1100, to a communication device 600 (e.g., a user equipment, UE), while the UE is operating in an active state, an idle state, or an inactive state, an early measurement configuration to perform a beam level measurement for a serving cell when the UE is operating in the idle state or the inactive state. In some embodiments, the configuration to perform the beam level measurement is provided to the UE within one or more MeasIdleCarrierNR-r16 information elements. In some embodiments, the method includes transmitting a configuration for beam level measurement for a neighboring frequency. The method includes receiving 1102 a beam level measurement result for the serving cell.

Example embodiments are also discussed below.

1. A method of operating a communication device in a communication network, the method comprising:
   - receiving a configuration to perform an early measurement for reporting to the communication network while operating in an idle state or an inactive state;
   - performing the early measurement while operating in the idle state or the inactive state; and
   - reporting an early measurement result to the communication network upon the communication device transitioning to a connected state.

2. The method of Embodiment 1, wherein the idle state comprises a Radio Resource Control Idle, RRC_IDLE, and the inactive state comprises a Radio Resource Control Inactive, RRC_INACTIVE, state.

3. The method of Embodiment 1 or 2, wherein the connected state comprises a Resource Control Connected, RRC_CONNECTED state.

4. The method according to embodiment 1, wherein receiving the configuration to perform the early measurement comprises receiving the configuration through dedicated signaling, broadcast signaling, or a combination of dedicated and broadcast signaling from the communication network.

5. The method according to embodiment 1, wherein the early measurement comprises a beam level measurement; and
   - wherein the configuration includes a configuration to perform the beam level measurement and reporting for a serving cell.

6. The method according to embodiment 5, wherein the configuration to perform the beam level measurement is provided to the communication device in one of a separate field or an information element, IE, in the early measurement configuration.

7. The method according to embodiment 5, wherein the configuration to perform the beam level measurement is provided to the communication device in a measurement idle carrier New Radio, NR, entity that is part of the communication device's early measurement configuration.

8. The method according to embodiment 7, further comprising determining whether to perform and/or include the beam level measurement for the serving cell in the early measurement report based on a comparison of a serving frequency of the communication device to a configuration of the measurement idle carrier NR entity.

9. The method according to embodiment 8, further comprising determining to perform and/or include the beam level measurement for the serving cell in the early measurement report based on a determination that the serving frequency of the communication device corresponds to a configuration of the measurement idle carrier NR entity.

10. The method according to embodiment 8, further comprising determining not to perform and/or include the beam level measurement for the serving cell in the early measurement report based on a determination that the serving frequency of the communication device does not correspond to a configuration of the measurement idle carrier NR entity.

11. The method according to embodiment 7, further comprising determining whether to perform and/or include the beam level measurement for the serving cell in the early measurement report based on a comparison of a neighboring New Radio, NR, frequency of the communication device to a configuration of the measurement idle carrier NR entity.

12. The method according to embodiment 11, further comprising determining to perform and/or include the beam level measurement for the serving cell in the early measurement report based on a determination the neighboring NR frequency of the communication device corresponds to the configuration of the measurement idle carrier NR entity.

13. The method according to embodiment 4, wherein the configuration to perform the beam level measurement is provided to the communication device in a configuration for cell (re)selection in system information.

14. The method according to embodiment 1, wherein the early measurement comprises a beam level measurement; and wherein the configuration includes a configuration for beam level measurement for a neighboring New Radio, NR, frequency in the early measurement configuration.

15. The method according to embodiment 14, wherein performing the early measurement comprises performing the early measurement based on the configuration for the neighboring NR frequency.

16. The method according to embodiment 15, wherein performing the early measurement based on the configuration for the neighboring NR frequency comprises selecting the configuration for the neighboring NR frequency from a list of configurations of several neighboring NR frequencies.

17. The method according to embodiment 1, wherein performing the early measurement comprises performing a measurement on a beam level for the serving cell.

18. The method according to embodiment 1, wherein reporting the early measurement result comprises reporting the beam level measurement result for the serving cell to the network.

19. A communication device (300) comprising:

processing circuitry (303); and memory (305) coupled with the processing circuitry, wherein the memory includes instructions that when executed by the processing circuitry causes the communication device to perform operations according to any of Embodiments 1-16.

20. A communication device (300) adapted to perform operations according to any of Embodiments 1-16.

21. A computer program comprising program code to be executed by processing circuitry (303) of a communication device (300), whereby execution of the program code causes the communication device (300) to perform operations according to any of embodiments 1-16.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 12:
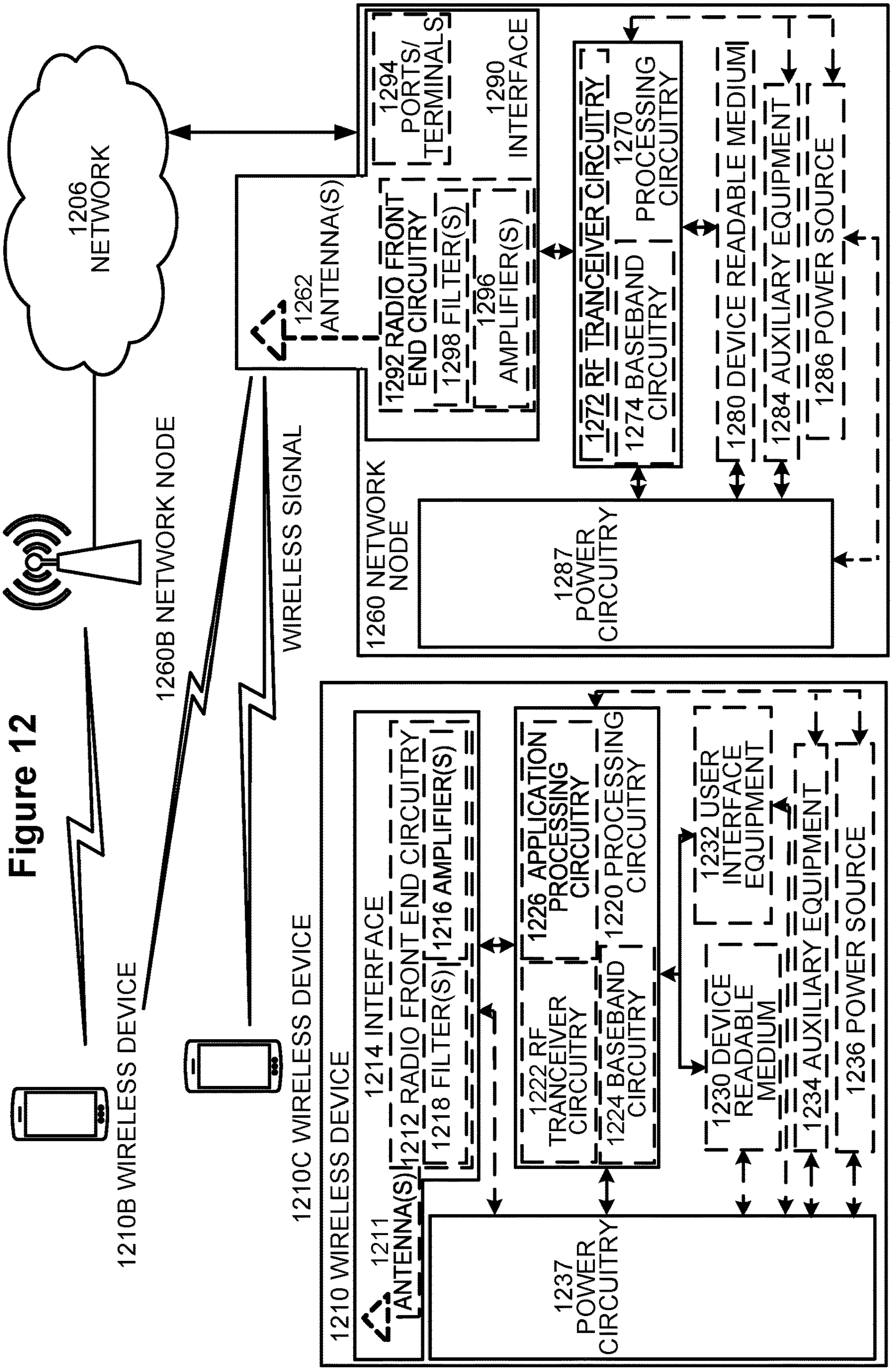
FIG. 12 is a block diagram of a wireless network in accordance with some embodiments.

FIG. 12 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260B, and WDs 1210, 1210B, and 1210C (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP (internet protocol) networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., mobile switching centers (MSCs), mobile management entities (MMEs)), operation and maintenance (O&M) nodes, operations support system (OSS) nodes, self-optimized network (SON) nodes, positioning nodes (e.g., evolved-serving mobile location centers (E-SMLCs)), and/or minimization of drive tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, global system for mobile communication (GSM), wide code division multiplexing access (WCDMA), LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units.

In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1292 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies may be integrated into the same or different chips or set of chips as other components within WD 1210.

Antenna 1212 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1212 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
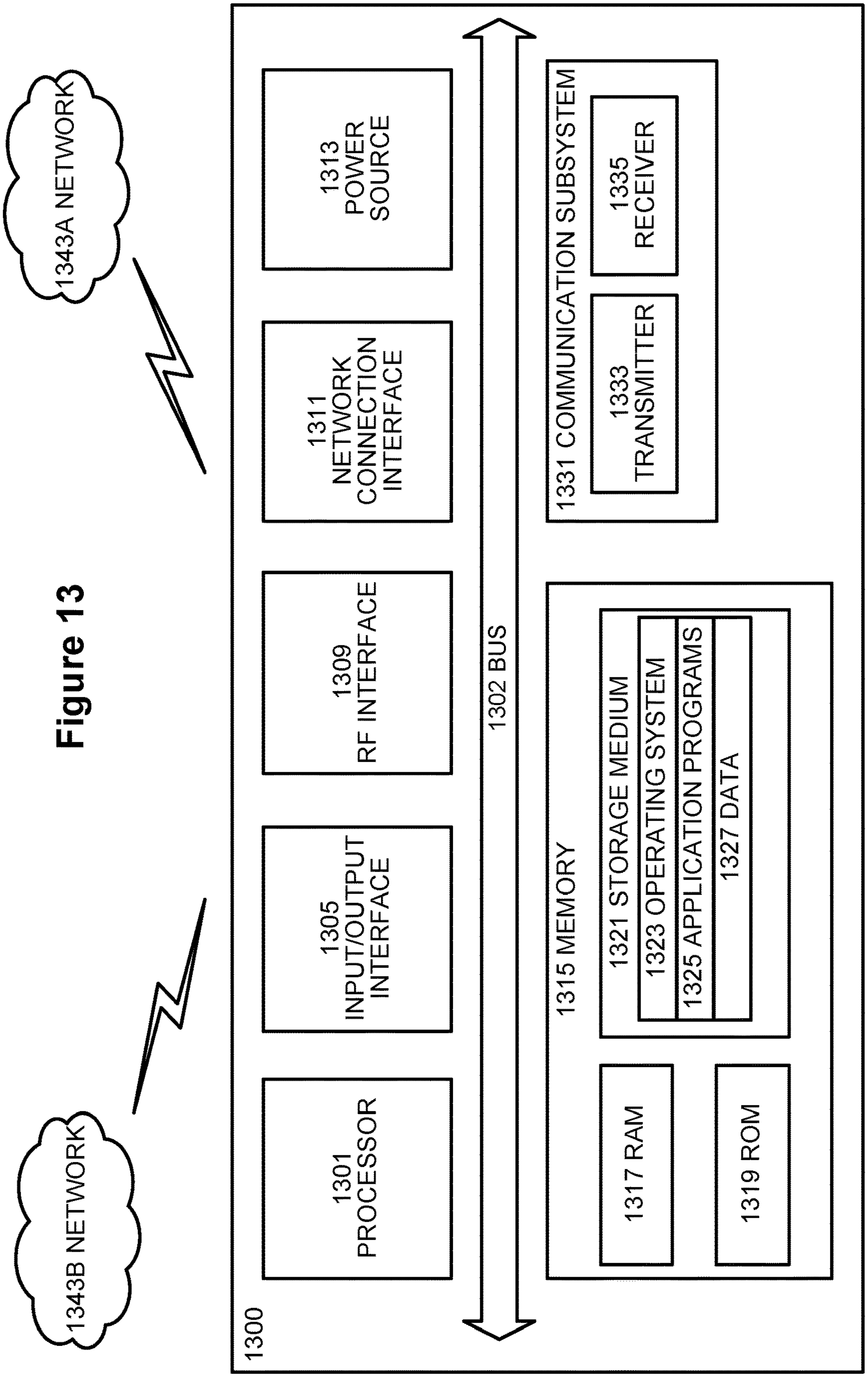
FIG. 13 is a block diagram of a user equipment in accordance with some embodiments

FIG. 13 illustrates a user Equipment in accordance with some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1300 may be any UE identified by the 3rd Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1313, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343A. Network 1343A may encompass wired and/or wireless networks such as a local-area network (LAN), a wide-area network (WAN), a computer network, a wireless network, a telecommunications network, another like network or any combination thereof. For example, network 1343A may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HODS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343B using communication subsystem 1331. Network 1343A and network 1343B may be the same network or networks or different network or networks. Communication subsystem 1331 may be configured to include one or more transceivers used to communicate with network 1343B. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.11, code division multiplexing access (CDMA), WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343B may encompass wired and/or wireless networks such as a local-area network (LAN), a wide-area network (WAN), a computer network, a wireless network, a telecommunications network, another like network or any combination thereof. For example, network 1343B may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
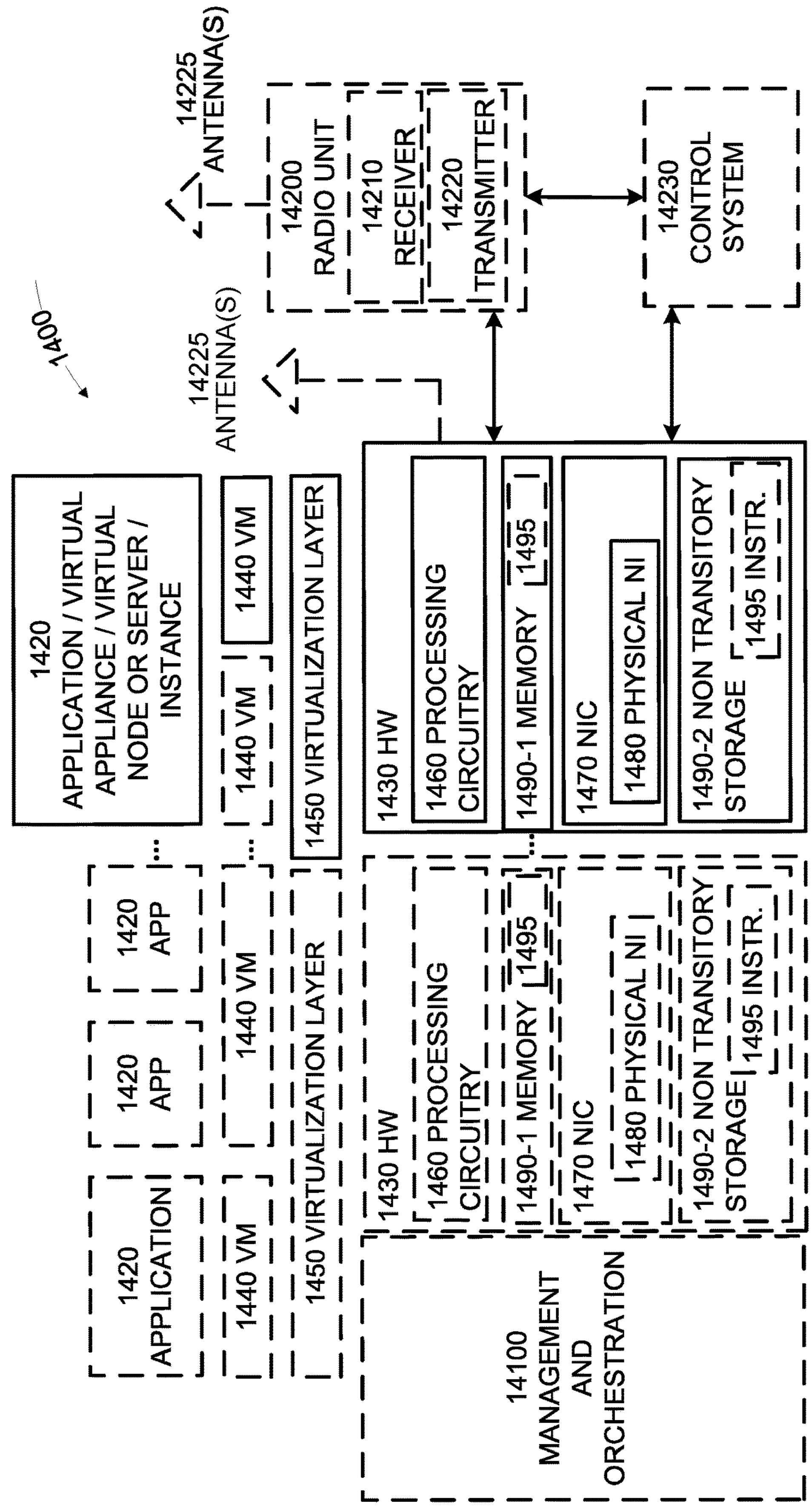
FIG. 14 is a block diagram of a virtualization environment in accordance with some embodiments.

FIG. 14 illustrates a virtualization environment in accordance with some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440 comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
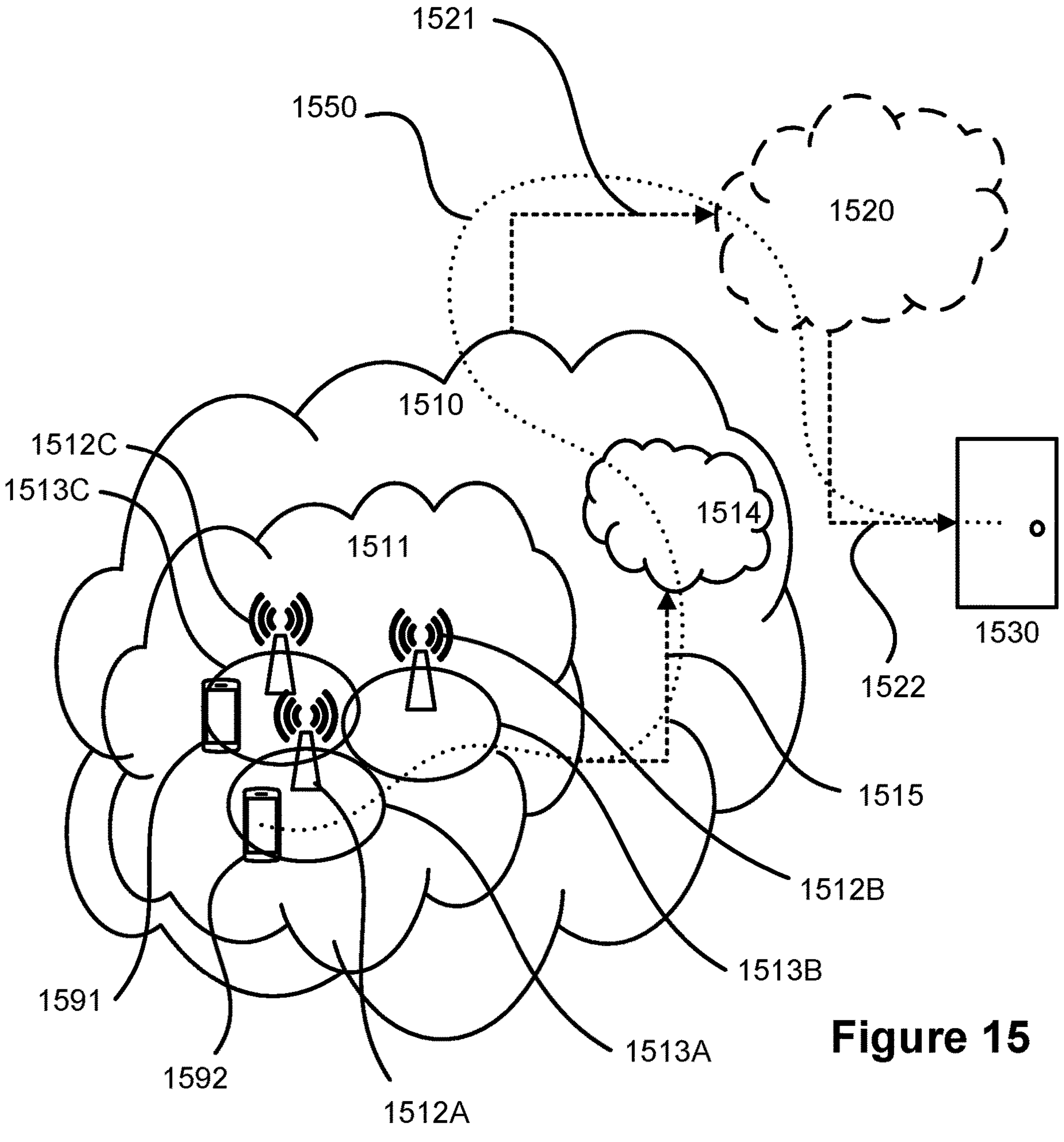
FIG. 15 is a block diagram of a telecommunication network connected via an intermediate network to a host computer in accordance with some embodiments.

FIG. 15 illustrates a telecommunication network connected via an intermediate network to a host computer in accordance with some embodiments.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512A, 1512B, 1512C, such as NBs, eNBs, gNBs or other types of wireless access points, each defining a corresponding coverage area 1513A, 1513B, 1513C. Each base station 1512A, 1512B, 1512C is connectable to core network 1514 over a wired or wireless connection 1515. A first UE 1591 located in coverage area 1513C is configured to wirelessly connect to, or be paged by, the corresponding base station 1512C. A second UE 1592 in coverage area 1513A is wirelessly connectable to the corresponding base station 1512A. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
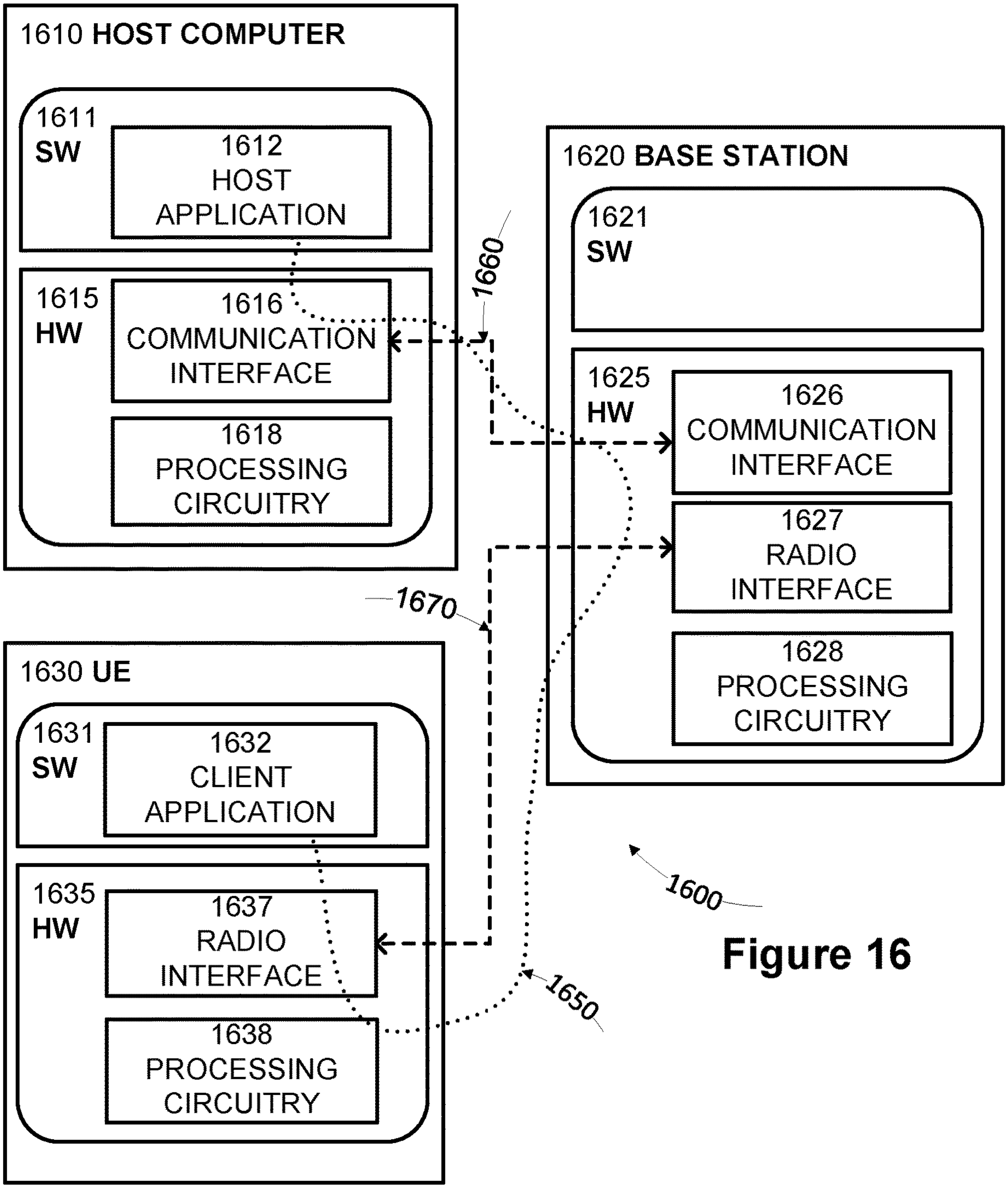
FIG. 16 is a block diagram of a host computer communicating via a base station with a user equipment over a partially wireless connection in accordance with some embodiments.

FIG. 16 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512A, 1512B, 1512C and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments may improve the performance of OTT services provided to UE 1630 using OTT connection 1650, in which wireless connection 1670 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
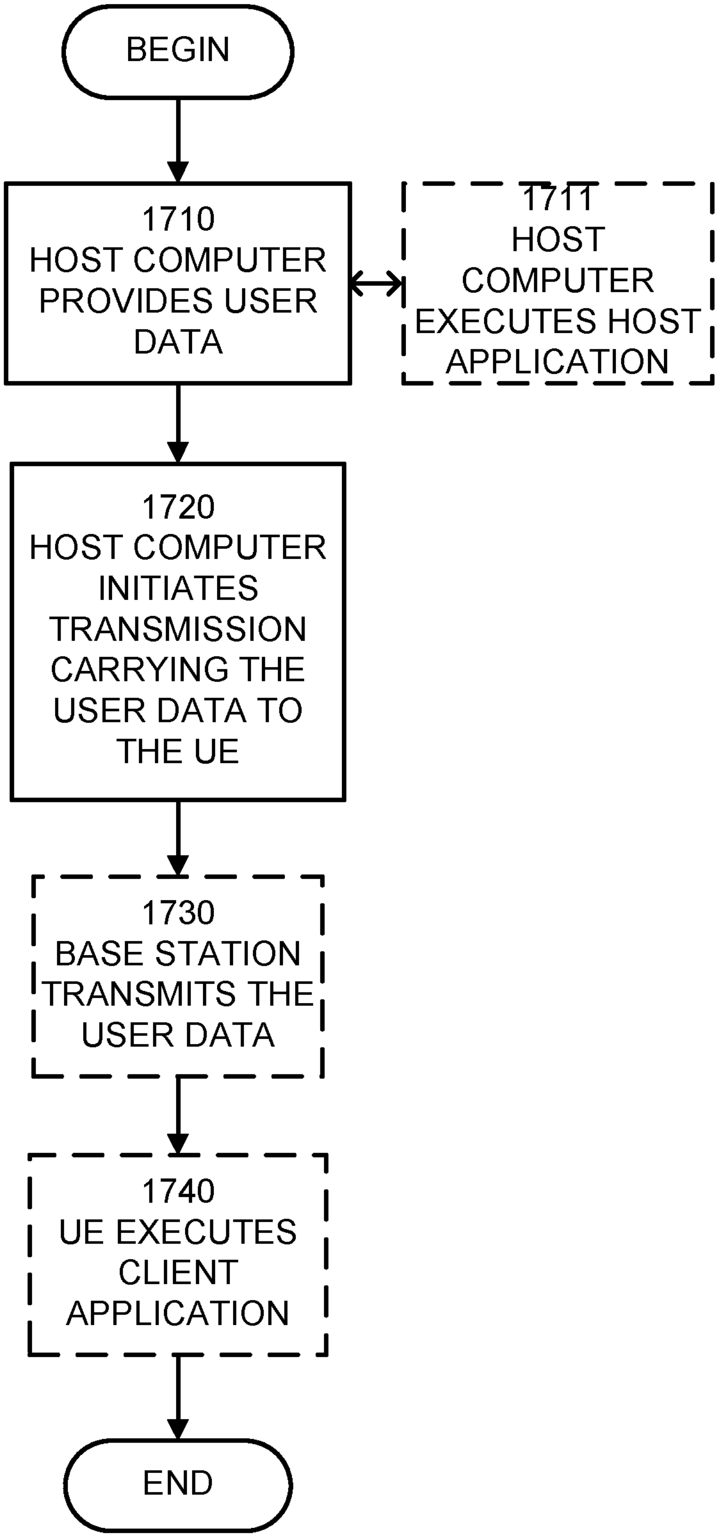
FIG. 17 is a block diagram of methods implemented in a communication system including a host computer, a base station and a user equipment in accordance with some embodiments.

FIG. 17 illustrates methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
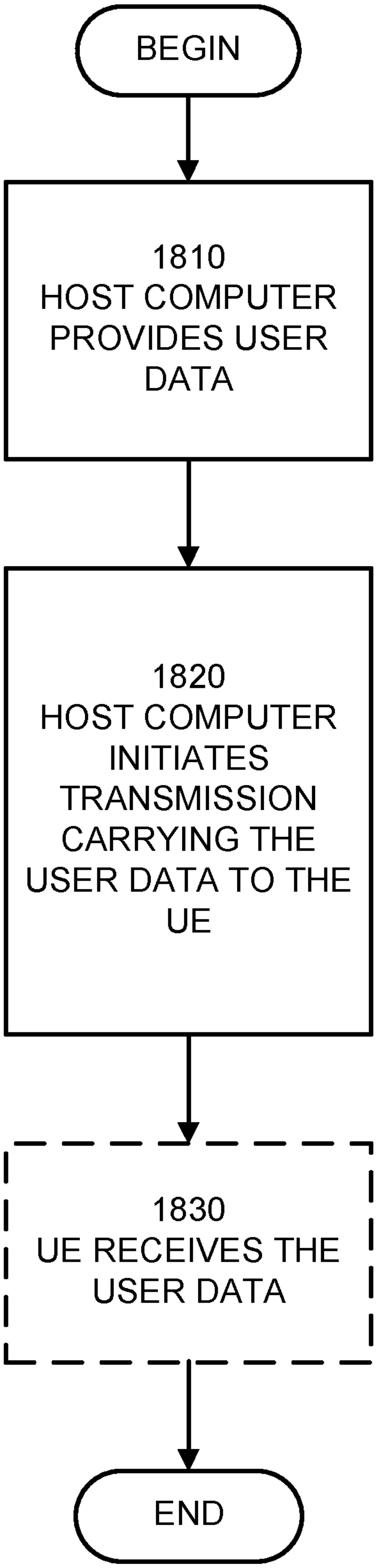
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
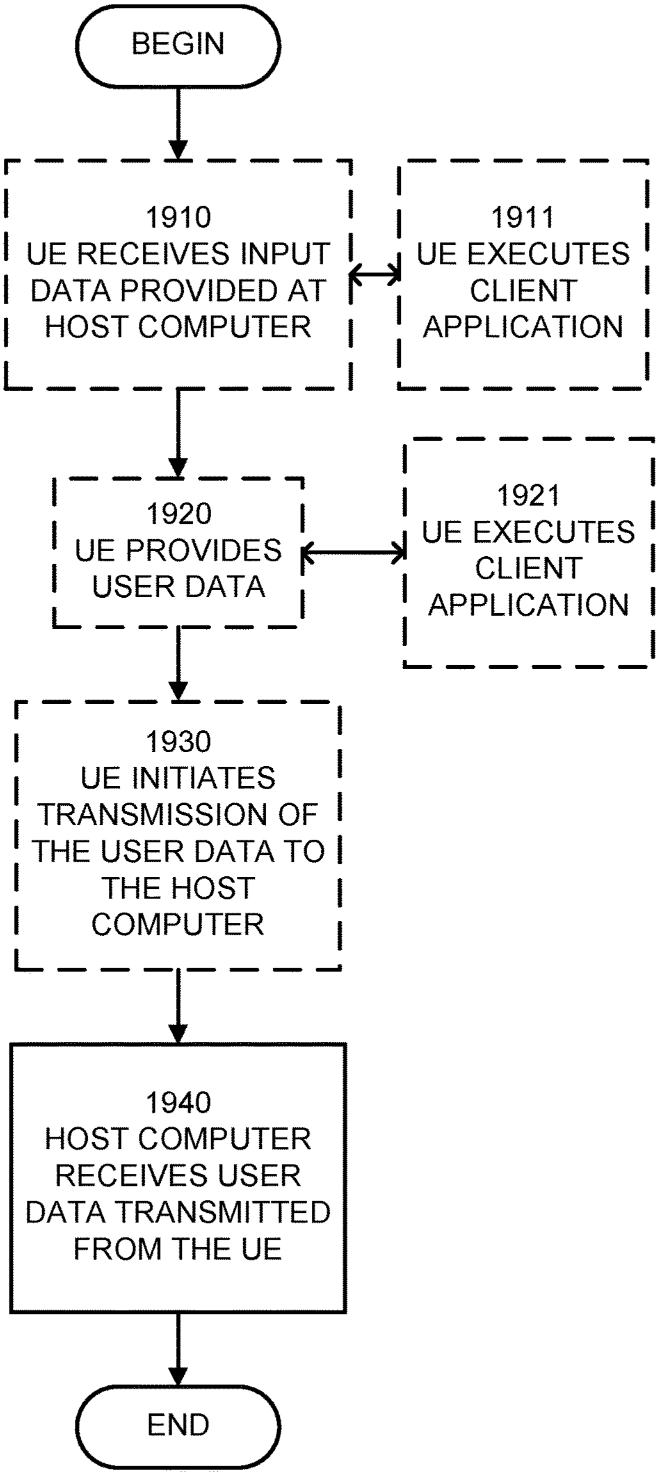
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1820, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
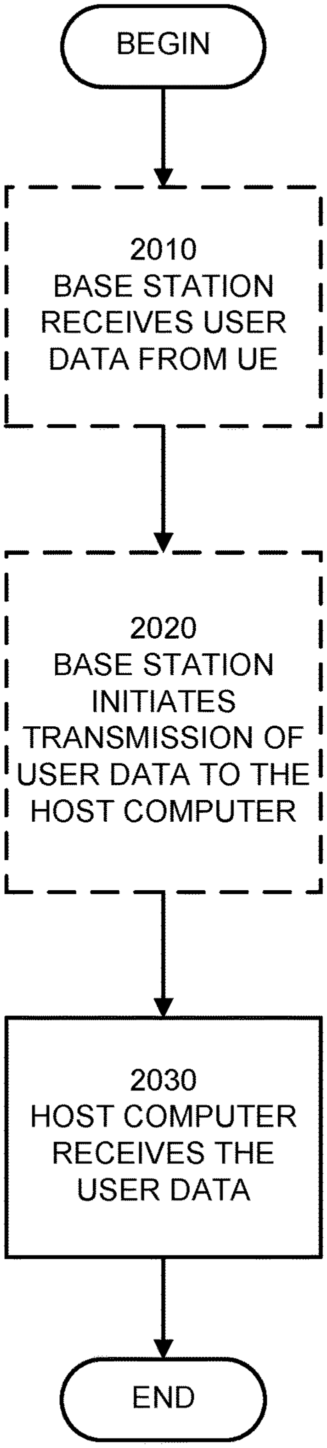
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a communication device in a communication network, the method comprising:

receiving, while operating in an idle state, a connected state, or an inactive state, an early measurement configuration to perform an early measurement for reporting to the communication network, wherein the early measurement configuration includes a configuration to perform a beam level measurement for a serving cell;

performing the early measurement including the beam level measurement for the serving cell while operating in the idle state or the inactive state; and reporting an early measurement result including the beam level measurement for the serving cell to the communication network upon the communication device transitioning to the connected state, wherein the configuration to perform the beam level measurement for the serving cell is provided to the communication device within one or more MeasIdleCarrierNR-r16 entities that are part of the early measurement configuration.

2. The method of claim 1, wherein the idle state comprises a Radio Resource Control Idle, RRC_IDLE, state the connected state comprises a Radio Resource Control Connected, RRC_CONNECTED state and the inactive state comprises a Radio Resource Control Inactive, RRC_INACTIVE, state.

3. The method according to claim 1, wherein receiving the early measurement configuration to perform the early measurement comprises receiving the early measurement configuration through dedicated signaling, broadcast signaling, or a combination of dedicated and broadcast signaling from the communication network.

4. The method according to claim 1, wherein the configuration to perform the beam level measurement for the serving cell is provided to the communication device in one of a separate field or an information element, IE, in the early measurement configuration.

5. The method according to claim 1, further comprising determining whether to perform and/or include the beam level measurement for the serving cell in an early measurement report based on a comparison of a serving frequency of the communication device to the one or more MeasIdleCarrierNR-r16 entities.

6. The method according to claim 5, further comprising determining to perform and/or include the beam level measurement for the serving cell in the early measurement report based on a determination that the serving frequency of the communication device corresponds to a configuration of any one of the MeasIdleCarrierNR-r16 entities.

7. The method according to claim 5, wherein determining whether to perform and/or include the beam level measurement for the serving cell in the early measurement report comprises determining to perform and/or include the beam level measurement for the serving cell in an early measurement report responsive to there being a matching MeasIdleCarrierNR-r16 entity which includes the beam level configuration for the serving cell.

8. The method according to claim 5, determining whether to perform and/or include the beam level measurement for the serving cell in an early measurement report based on a comparison of a serving frequency of the communication device to the one or more MeasIdleCarrierNR-r16 entities comprises determining not to perform and/or include the beam level measurement for the serving cell in an early measurement report responsive to there being a matching MeasIdleCarrierNR-r16 entity which does not include the beam level configuration for the serving cell.

9. The method according to claim 5, further comprising determining not to perform and/or include the beam level measurement for the serving cell in the early measurement report based on a determination that the serving frequency of the communication device does not correspond to a configuration of any one of the one or more MeasIdleCarrierNR-r16 entities.

10. The method according to claim 1, further comprising determining whether to perform and/or include the beam level measurement for the serving cell in an early measurement report based on a comparison of a neighboring New Radio, NR, frequency of the communication device to a configuration of any one of the MeasIdleCarrierNR-r16 entities.

11. The method according to claim 1, further comprising determining whether to perform and/or include the beam level measurement for the serving cell in an early measurement report based on determining that at least one of a configuration for any neighbouring NR frequency includes a configuration for beam level measurements or there is a configuration for a neighboring NR frequency that includes a configuration for beam level measurements that includes a separate mechanism to determine which entity to use.

12. The method according to claim 1, wherein the configuration to perform the beam level measurement is provided to the communication device in a configuration for cell (re)selection in system information.

13. The method according to claim 1, wherein the early measurement configuration further includes a configuration for beam level measurement for a neighboring New Radio, NR, frequency.

14. The method according to claim 13, wherein performing the early measurement further comprises performing the early measurement based on the configuration for beam level measurement for the neighboring NR frequency.

15. The method according to claim 13, wherein performing the early measurement based on the configuration for the beam level measurement for the neighboring NR frequency comprises selecting a configuration for the neighboring NR frequency from a list of configurations of several neighboring NR frequencies.

* * * * *